United States Patent

Yamamoto et al.

[11] Patent Number: 5,513,720
[45] Date of Patent: May 7, 1996

[54] POWER STEERING APPARATUS FOR VEHICLE

[75] Inventors: Youichi Yamamoto; Mitsuhiko Harara; Hiroaki Yoshida; Nobuo Momose; Tadao Tanaka, all of Okazaki; Tsuyoshi Takeo, Nagoya, all of Japan

[73] Assignee: Mitsubishi Jidosha Kogyo Kabushiki Kaisha, Tokyo, Japan

[21] Appl. No.: 429,016

[22] Filed: Apr. 26, 1995

Related U.S. Application Data

[63] Continuation of Ser. No. 275,315, Jul. 13, 1994, abandoned, which is a continuation of Ser. No. 964,348, Oct. 21, 1992, abandoned.

[30] Foreign Application Priority Data

| | | | |
|---|---|---|---|
| Oct. 23, 1991 | [JP] | Japan | 3-275653 |
| Oct. 7, 1992 | [JP] | Japan | 4-268845 |
| Oct. 7, 1992 | [JP] | Japan | 4-268846 |
| Oct. 7, 1992 | [JP] | Japan | 4-268847 |
| Oct. 7, 1992 | [JP] | Japan | 4-268848 |

[51] Int. Cl.$^6$ ............ B62D 5/06; B62D 5/083; B62D 6/00
[52] U.S. Cl. ............ 180/141; 180/79.1; 180/142; 180/143; 180/149; 180/DIG. 4; 180/DIG. 7
[58] Field of Search ............ 180/79.1, 142, 180/141, 143, 147, 148, 149, DIG. 3, DIG. 4, DIG. 7

[56] References Cited

U.S. PATENT DOCUMENTS

| | | | |
|---|---|---|---|
| 4,715,464 | 12/1987 | Nakamura et al. | 180/148 |
| 4,759,419 | 7/1988 | Nagae et al. | 180/141 |
| 4,877,100 | 10/1989 | Emori et al. | 180/149 |
| 4,905,784 | 3/1990 | Yamashita | 180/143 |
| 4,913,250 | 4/1990 | Emori et al. | 180/143 |
| 4,957,468 | 9/1990 | Otsuka et al. | 180/141 |
| 5,016,723 | 5/1991 | Sano | 180/143 |
| 5,135,068 | 8/1992 | Emori et al. | 180/143 |

*Primary Examiner*—Mitchell J. Hill
*Attorney, Agent, or Firm*—Abelman, Frayne & Schwab

[57] ABSTRACT

A power steering apparatus for a vehicle including a steering mechanism having a torsion bar, a rotary valve connected to an oil pump and disposed between an input shaft and an output shaft, a valve driving mechanism having a pressed portion projected on either the input shaft or the output shaft and a plunger on the one shaft of the input shaft or output shaft on which the pressed portion is not projected for pressing the pressed portion, setting a target assist force of an assist force of an assist force obtained by rotating the rotary valve in the torsion direction of the torsion bar and an assist force obtained by rotating the rotary valve in the reverse direction to the torsion direction, a plunger driving mechanism for driving the plunger so that the preset assist force is obtained, controlling the pressure itself of the rotary valve to the operation angle of the rotary valve, whereby varying the steering force of the steering wheel over a wide range of steering condition with a reduced burden to the driver.

21 Claims, 31 Drawing Sheets

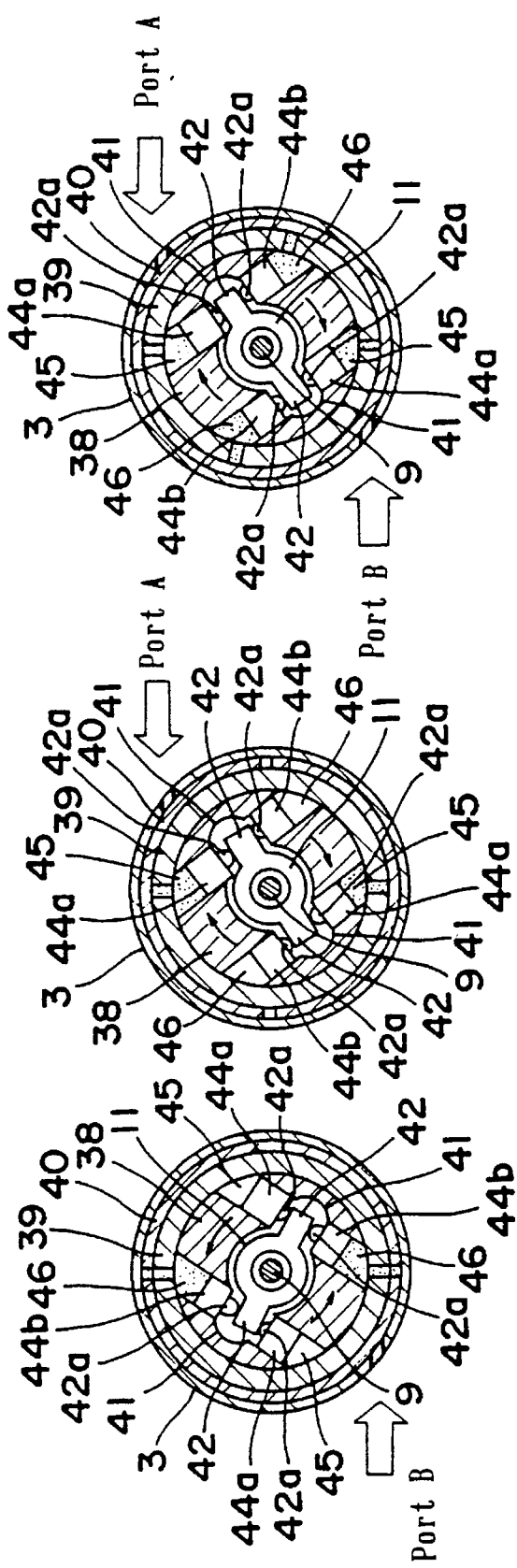

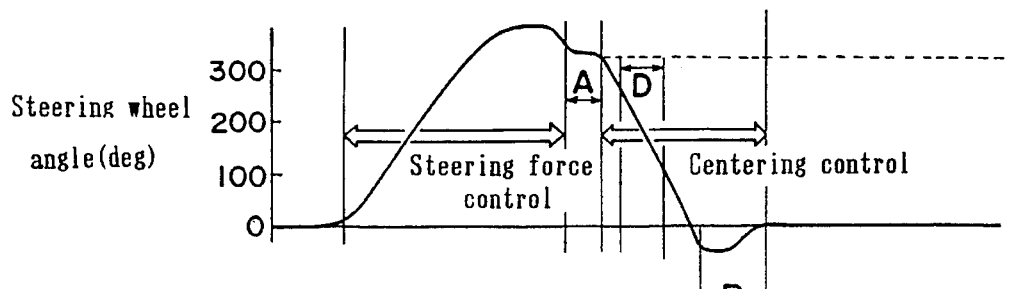
FIG.21(a)
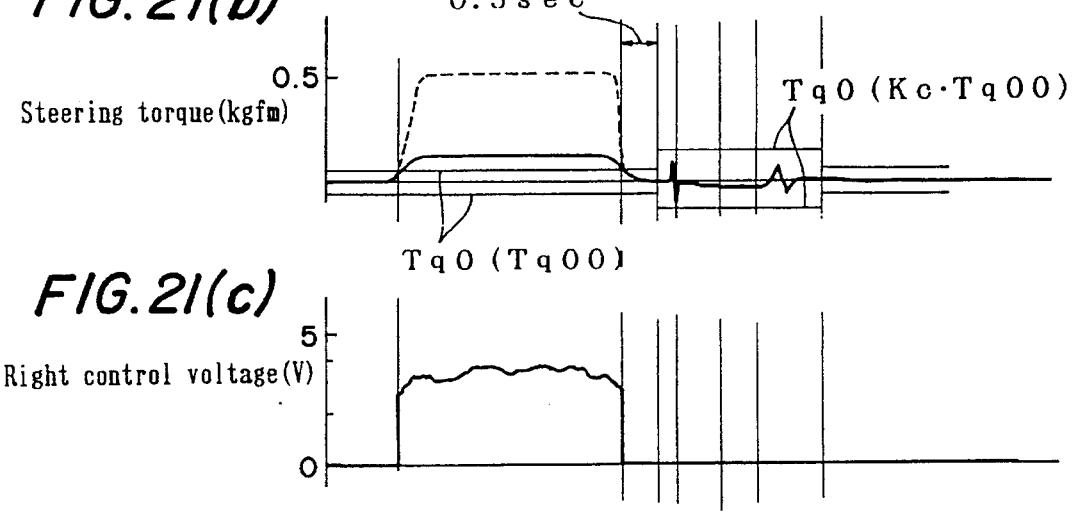
FIG.21(b)
FIG.21(c)
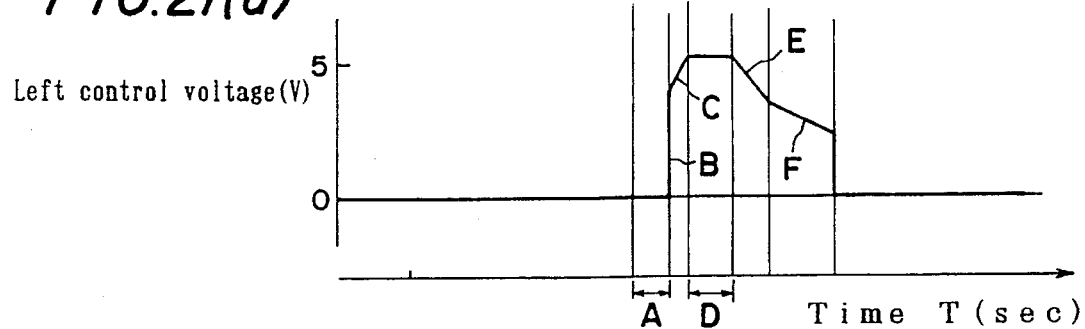
FIG.21(d)

POWER STEERING APPARATUS FOR VEHICLE

This application is a continuation of U.S. Ser. No. 08/275,315, filed Jul. 13, 1994 (now abandoned) which is a continuation of U.S. Ser. No. 07/964,348, filed Oct. 21, 1992 (now abandoned).

FIELD OF THE INVENTION

This invention relates to a power steering device used to steer, for example, the front wheels of an automobile.

DESCRIPTION OF THE PRIOR ART

An automobile is equipped with a hydraulic power steering apparatus to enable steering by the use of a light force exerted on a steering wheel by the driver.

In this device, an input shaft is connected to a steering wheel, and an output shaft is connected to steered wheels (front wheels) which are linked by a torsion bar. Rotational force of the input shaft is transmitted as a steering force to the front wheels through a hydraulic assist system.

In the assist system, a rotary valve, which undergoes a relative dislocation according to the distortion of the torsion bar, is disposed between the input shaft and the output shaft. The rotary valve is connected to an engine-drive oil pump and to a power cylinder to drive the front wheels to a steering direction. Hydraulic pressure obtained by the rotary valve, which undergoes a relative dislocation according to the rotational extent of the steering wheel is supplied to the power cylinder to generate a steering assist force.

Specifically, when the steering wheel is turned, the output shaft is rotated through the input shaft and the torsion bar. At this moment, the output shaft is impeded in rotating by a road surface resistance of the front wheels, the torsion bar is distorted in an amount of the road surface resistance, and the input shaft rotates in excess of the distortion angle of the torsion bar.

This causes the rotary valve disposed between the input shaft and the output shaft to generate a rotational difference (relative dislocation), and a hydraulic pressure generated by the rotational difference is supplied to a cylinder chamber of the power cylinder. By supplying a hydraulic pressure to the power cylinder, the front wheels are steered to the rotational direction of the steering wheel, thereby reducing the steering force.

On the other hand, there is a prior art power steering apparatus including a counter-force mechanism to generate a counter-force in the assist system and a control valve for controlling the counter-force mechanism, whereby the response of the steering wheel is made variable to improve the operability of the steering wheel.

The counter-force mechanism will now be described.

The input shaft (or the output shaft) is provided with a pair of projections protruding at both sides in the radial direction, and two pairs of the projections are provided along the axial direction.

The output shaft (or the input shaft) is provided with a first counter-force piston, which urges one of the pairs of axial-direction projections to rotate the inputs shaft from one direction to a relative rotation neutral position, and the second counter-force piston is disposed at a diagonal position across the center of the input shaft, symmetrically with the first counter-force piston.

The first counter-force piston and the second counter-force piston are caused to contact against the projections on the input shaft to add a counter-force to the rotational force of the input shaft, that is, the steering force of the steering wheel, and the driving hydraulic pressure for the first counter-force piston and the second counter-force piston is controlled by a control valve to make the steering wheel response variable. (Japanese Patent Laid-open Publication No. 130475/1988).

In the prior art power steering apparatus, the relationship between operation angle of the rotary valve and hydraulic pressure generated from the rotary valve is determined solely by the distortion degree in association with rotation of the steering wheel. Therefore, the steering force cannot be adequately controlled only by the dislocation of the rotary valve, limiting the variation range of the steering force.

Furthermore, hydraulic pressure control of the control valve to drive the first counter-force piston and the second counter-force piston of the counter-force mechanism is performed solely according to a map determined from the steering angle of the steering wheel and the vehicle speed. Therefore, variation range of the steering force in the counter-force mechanism is also restricted.

Moreover, since, the counter-force mechanism of the prior art power steering apparatus, a pair of projections are provided on the input shaft (or the output shaft) in two stages in the axial direction the shaft, and a counter-force piston is provided for each radial projection, the power steering apparatus tends to be longer in the axial direction, hindering achieving a lightweight, compact apparatus.

Furthermore, since the counter-force mechanism is only to give the steering force of the steering wheel a counter-force, the steering wheel does not revert back when the driver separates his hands from the steering wheel. In particular, when the steering wheel is to be returned while the vehicle is in a standstill condition after the steering wheel is largely steered, the driver is required to exert a high steering wheel returning force.

With a view to eliminate the above prior art problems of power steering apparatus, it is a primary object of the present invention to provide a power steering apparatus which lightens the driver's burden under wide steering conditions and enables steering suited to the steering condition.

SUMMARY OF THE INVENTION

In accordance with the present invention which attains the above object, there is provided a power steering apparatus for a vehicle comprising: a steering mechanism including an output shaft connecting to steered wheels linked to one end of a torsion bar and an input shaft connecting to a steering wheel linked to the other end of the torsion bar, for steering the steered wheels according to the steering wheel; a hydraulic pressure generation unit for generating a predetermined hydraulic pressure; a rotary valve disposed between the input shaft and the output shaft of the steering mechanism and connected to the hydraulic pressure generation unit undergoing a relative dislocation according to a distortion of the torsion bar to output a hydraulic assist force during operation of the steering wheel; a cylinder mechanism for driving the steered wheels in a steering direction by a hydraulic pressure from the rotary valve; a valve driving mechanism disposed between he input shaft and the output shaft of the steering mechanism, and having at least one pressed portion projecting on either the input shaft or the output shaft and plungers provided on one of the input shaft and the output shaft on which said pressed portion does not project for pressing the pressed portion to generate an independent torsional moment in the torsion bar due to pressing of the pressed portion by driving the plungers; plunger driving means for driving the plungers of the valve driving mechanism by electromagnetic excitation of an electromagnetic valve; and control means, set with a range of target assist force as a target value of an assist force obtained by rotating the rotary valve in the same direction as a torsion direction of the torsion bar and an assist force obtained by rotating the rotary valve in the direction reverse to the torsion direction of the torsion bar, for exciting the electromagnetic valve to drive the plungers of the valve driving means so that the target assist force is obtained during operation of the steering wheel.

When the steering wheel is steered, the torsion bar to be twisted by a difference from the road surface resistance is twisted in a predetermined direction to generate a target assist force by the function of the valve driving mechanism. With this control, the rotary valve is first driven by the valve driving mechanism, and then driven by the torsion bar twisted by the difference from the road surface resistance, supplying a hydraulic pressure necessary for the cylinder mechanism.

Steering force obtained at this time varies in a wide range set by combining a steering force of the output of the rotary valve in the operation angle range of the torsion bar twisted by the operation of the steering wheel, a light steering force (generated by the fact that the pressure of the rotary valve rises faster than the steering by steering wheel manipulation) generated by the fact that the rotary valve is rotated in the torsion direction (same phase: operation angle increasing) of the torsion bar by the plunger of the valve driving mechanism, and a heavy steering force (generated by the fact that the pressure of the rotary valve rises later than the steering by steering wheel manipulation) generated by the fact that the rotary valve is rotated in the reverse direction to the torsion direction (reverse phase: operation angle decreasing) of the torsion bar by the plunger of the valve driving mechanism.

During a centering control function, hydraulic pressure of the valve driving mechanism gradually increases at the beginning of assist force generation, and the hydraulic pressure of the valve driving mechanism gradually decreases at the completion of assist force generation.

In a low-speed region, a steering force control function is performed when a steering torque of the steering wheel exceeds a control determination torque threshold value, and the centering control function is performed when the steering torque of the steering wheel is within the control determination torque threshold value. At this time, since the control determination torque threshold value for determining execution of the centering control function is set greater than the control determination torque threshold value for determining execution of the steering force control function, the steering torque does not exceed the control determination torque threshold value during the centering control function even when the steering torque temporarily increases due to inertia of the steering wheel of the like.

Furthermore, in the low-speed region, the centering control function is performed when the steering force of the steering wheel continues to be at a value within the control determination torque threshold value, and no immediate shift to the centering control function takes place even if the steering torque decreases momentarily.

When determining the steering direction in the steering force control function, the determination is made with the control determination torque threshold value in the reverse steering direction, and the determination of the steering wheel angular velocity is made with the steering wheel angular velocity in the reverse steering direction, thereby preventing mis-operation in the change over of the steering direction.

In the steering force control function, the assist force is increased when a torque difference between the target steering torque and an actual steering torque is greater than the previous torque difference, ad the assist force is decreased with the passage of time when the torque difference is smaller than the previous torque difference, thereby reducing the variation frequency of control amount during the steering force control function.

In the centering control function, a returning direction of the steering wheel is determined from the steering wheel angle of a predetermined angle or more, returning the steering wheel in the determined direction until a reverse setting angle is reached.

In a steering counter-force control function, magnitude and direction of the assist force are determined according to the torque difference between the calculated steering torque and the actual steering torque so that the steering torque is the target steering torque.

Furthermore, since the target torque necessary for the steering wheel manipulation is determined by positive feedback of the steering wheel angular velocity, a phase advance control is performed in which the steering wheel angle goes ahead of the steering wheel force.

BRIEF DESCRIPTION OF THE DRAWINGS

FIG. 5 is a schematic view showing action of hydraulic pressure to a hydraulic chamber.

FIG. 21 is a timing chart in assist control of the low-speed side of the power steering apparatus.

DETAILED DESCRIPTION OF THE PREFERRED EMBODIMENTS

Figure 1:
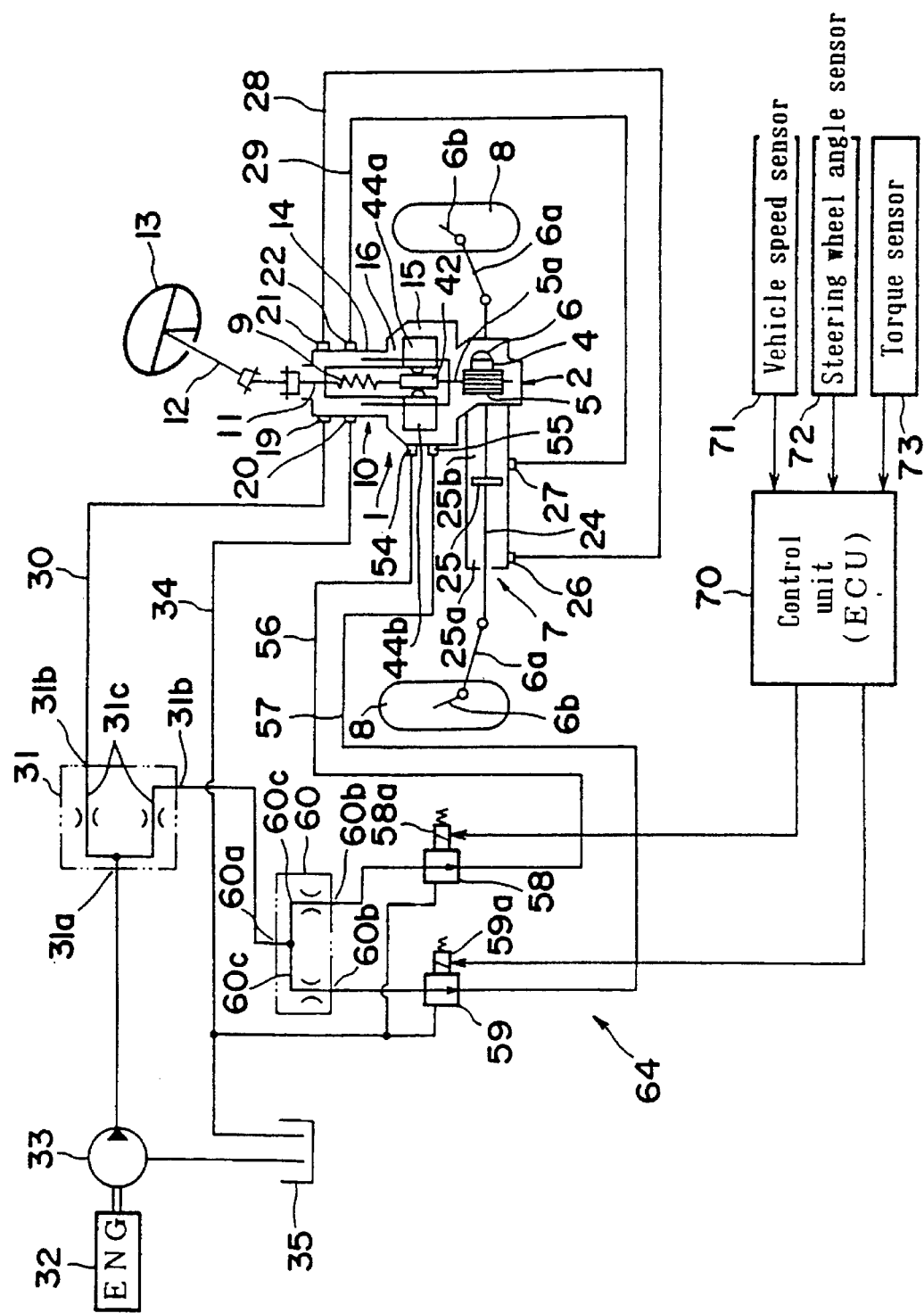
FIG. 1 is a schematic view showing the entire structure of an embodiment of the power steering apparatus according to the present invention.
Figure 3:
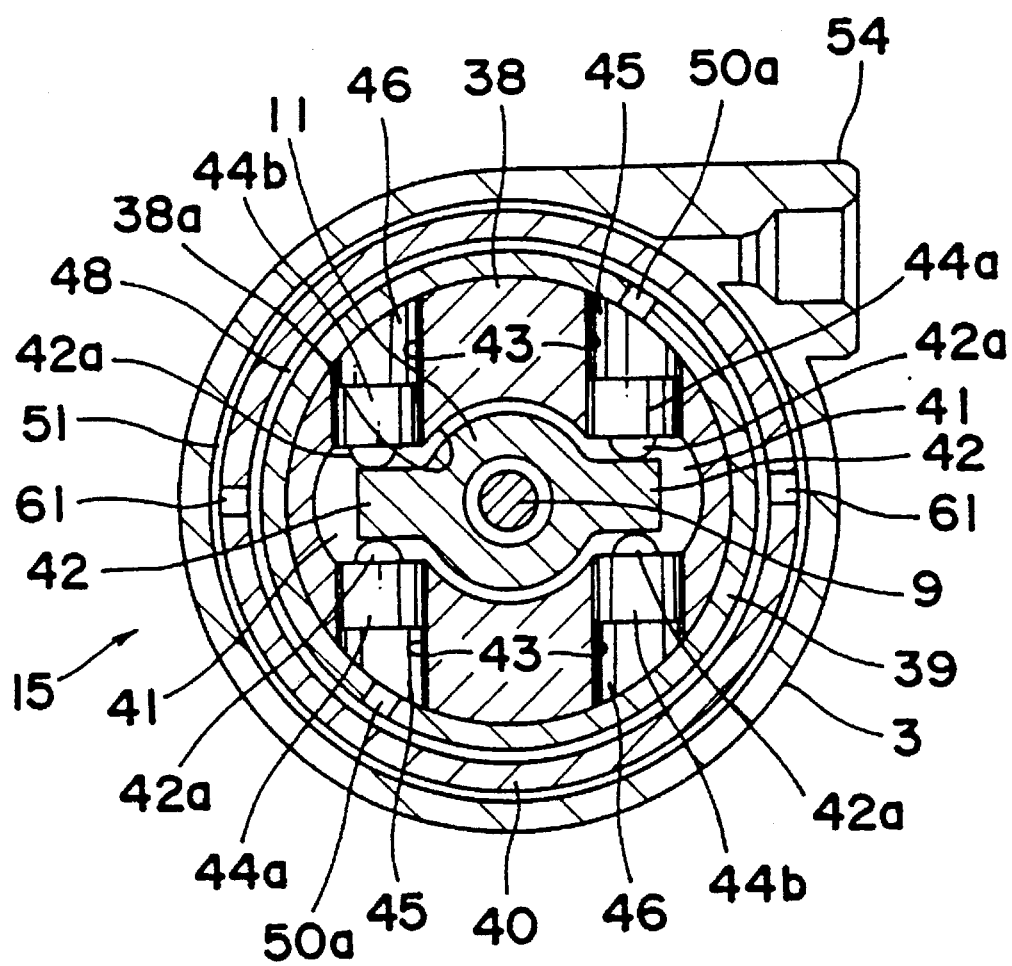
FIG. 3 is a schematic sectional view taken along line III—III in FIG. 2.
Figure 4:
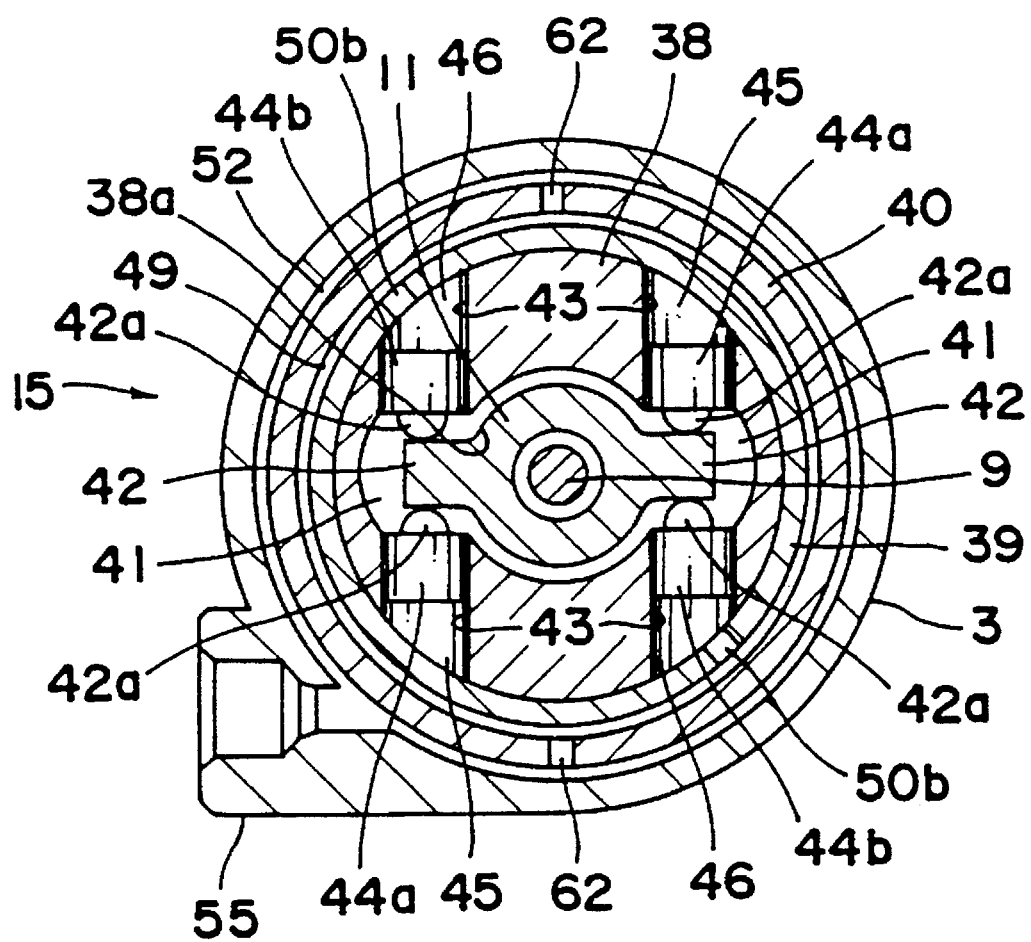
FIG. 4 is a schematic sectional view taken along line IV—IV in FIG. 2.

Preferred embodiments of the present invention will now be described with reference to the drawings. FIG. 1 is a schematic view showing the entire structure of an embodiment of the power steering apparatus according to the present invention, FIG. 2 is a schematic sectional view of a steering mechanism, FIG. 3 is a schematic sectional view taken along line III—III in FIG. 2, and FIG. 4 is a schematic sectional view taken along line IV—IV in FIG. 2.

Figure 2:
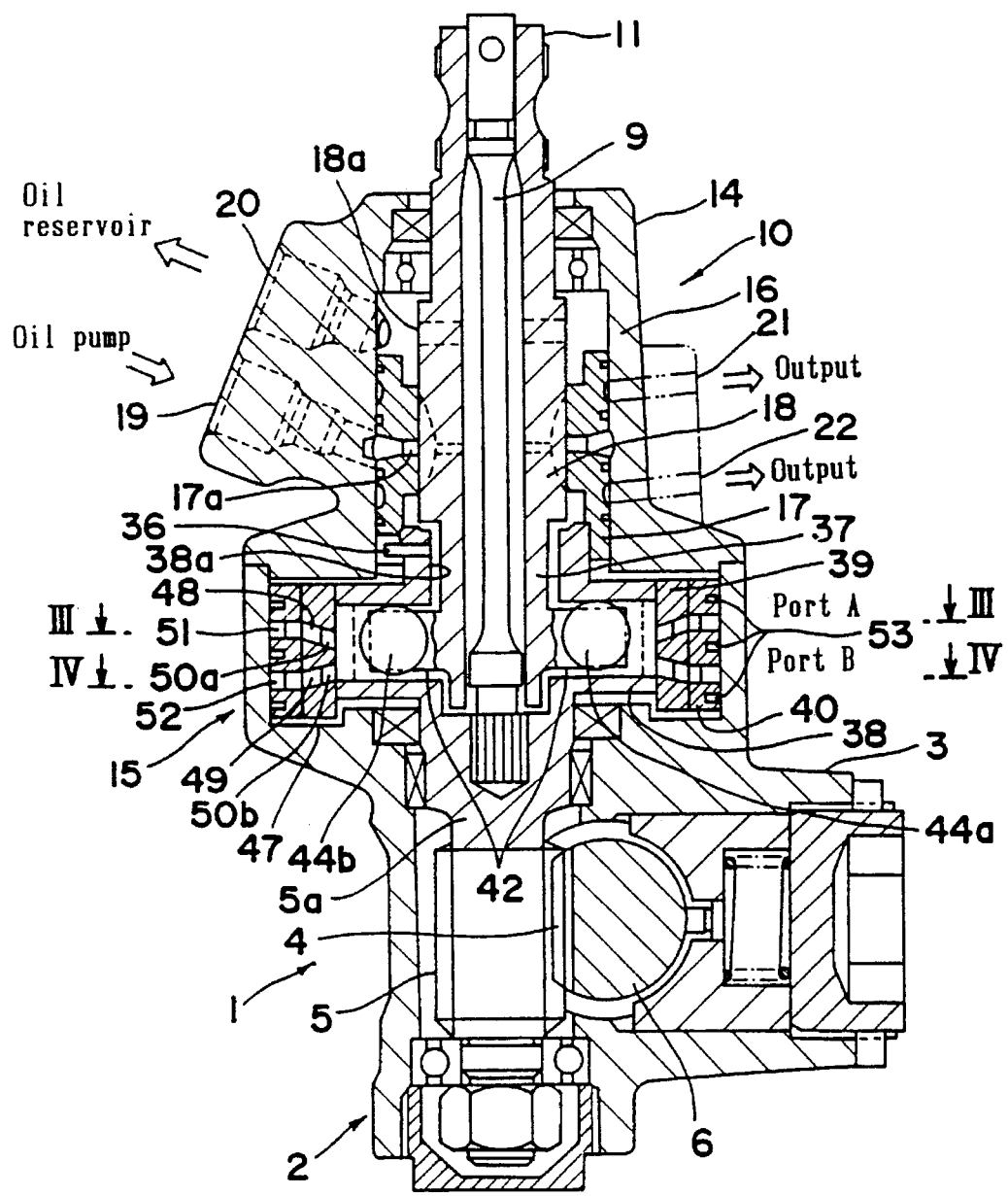
FIG. 2 is a schematic sectional view of a steering mechanism.

In FIG. 2, numeral 2 indicates, for example, a rack-and-pinion type steering gear for a steering mechanism 1, and the steering gear 2 incorporates a rack 4 and a pinion 5 in a casing 3.

As shown in FIG. 1, one end of the rack 4 is connected to one front wheel 8 through a steering rod 6, a tie rod 6a, and a knuckle 6b. The other end of the rack 4 is connect to the other front wheel 8 through a power cylinder unit (cylinder mechanism) 7, the tie rod 6a, and the knuckle 6b.

The pinion 5 of the steering gear 2 is connected with the lower end of a torsion bar 9 through an output shaft 5a. The upper end of the torsion bar 9 penetrates a valve unit 10 disposed at an upper portion of the steering gear 2, and is connected to an input shaft 11. The end of the input shaft 11 is connected to a steering wheel 13 through a steering shaft 12. When a rotational dislocation is inputted from the steering wheel 13, the right and left front wheels 8 are steered through the steering shaft 12, the torsion bar 9, the pinion 5, rack 4, and the steering rod 6.

In the valve unit 10, a housing 14 is disposed at an upper portion of the steering gear 2 so as to surround the torsion 9 and, in the portion from the upper portion of the steering gear 2 to the inside of the housing 14, a valve drive actuator 15 (valve drive mechanism) and a rotary valve 16 are disposed in this order from the lower side.

In the rotary valve 16, a cylindrical outer valve 17 is rotatably disposed on the inside surface of the housing 14, and a cylindrical inner valve 18 engaging with the outer valve 17 is integrally disposed on the input shaft 11. That is, in the rotary valve 16, when the torsion bar 9 is distorted by the rotation operation from the steering wheel 13, a relative dislocation is generated between the outer valve 17 and the inner valve 18.

An inlet port 17a formed in the outer valve 17 communicates with an inlet port body 19 provided in the housing 3, and an outlet port 18a formed in the inner valve 18 communicates with an outlet port body 20 provided in the housing 3. Furthermore, an output port (not shown) formed in the outer valve 17 communicates with a pair of output port units 21 and 22 provided in the housing 3. The output port units 21 and 22 are connected to the power cylinder unit 7.

In the power cylinder unit 7, as shown in FIG. 1, a piston rod 24 is slidable disposed penetrating a cylinder 23, and a piston 25 is disposed in part of the piston rod 24 to partition the cylinder 23 into two parts (right and left) in the longitudinal direction. A pair of input ports 26 and 27 communicating with right and left chambers 25a and 25b partitioned by the piston 25 are connected to the output port units 21 and 22 through passages 28 and 29.

The inlet port body 19 of the housing 3 is connected to an oil pump 33 (hydraulic pressure generation unit) with a relief valve driven by a vehicle driving engine 32 through a passage 30 and a splitter unit 31 (one inlet unit 31a and two outlet units 31b and 31b connected with passages 31c and 31c having orifices). The outlet port body 20 of the housing 3 is connected to an oil reservoir 35 through a passage 34, thus forming a hydraulic circuit for the power cylinder unit 7.

When the outer valve 17 and the inner valve 18 of the rotary valve 16 dislocate relative to each other, a hydraulic pressure according to the steering force and steering direction is supplied from the rotary valve 16 to the chambers 25a and 25b of the power cylinder unit 7. That is, the front wheels 8 are steered while being assisted by a hydraulic pressure.

Next, the valve drive actuator 15 will be described.

An extended portion 37 is formed at the lower end portion (shaft portion right beneath the inner valve 18) of the input shaft 11 and, in the extended portion 37, the lower end portion of the input shaft 11 is extended downward along the axial direction of the torsion bar 9. A hollow circular large-diameter portion 38 integrally linked to the output shaft 5a is rotatably incorporated in a circular chamber 47. The large-diameter portion 38 is connected to the outer valve 17 of the rotary valve 16 through a pin 36. An inner sleeve 39 is provided on the entire outer peripheral surface of the large-diameter portion 38, and an outer sleeve 40 is rotatably provided on the inner peripheral surface of a chamber 41 opposing the inner sleeve 39.

As shown in FIG. 3 and FIG. 4, in the large-diameter portion 38, flat concave chambers 41 extending to the outside in the radial direction from individual two symmetrical positions 180 degrees apart in the circumferential direction in a through hole 38a of the large-diameter portion 38 are formed.

On the extended portion 37 covered with the large-diameter portion 38, plate-formed pressed portions 42 protruding to the outside in the radial direction are individually formed from two symmetrical positions 180 degrees apart in the circumferential direction. The pressed portions individually have smaller dimensions in length and width than the chambers 41, and are disposed concentrically within the chambers 41. Spacings between the plate-formed pressed portions 42 and the flat chambers 41 are determined to sizes that can set areas required for compensating for an operating angle of the rotary valve 16, so that the torsion bar 9 can be distorted in a predetermined angular range relative to the input shaft 11.

On both sides of the chambers 41 of the large-diameter portion 38, holes, for example, four circular holes 43 are symmetrically formed serially putting pressed portions 42 between. Each of the holes 43 is slidable engage symmetrically in the axial direction with plungers 44a and 44b. A projection 42a is formed at the center of the tip of each of the plungers, and a plate surface of the pressed portion 42 is pressed by the projection 42a. Total length of each of the plungers 44a and 44b is set shorter than the length of the hole 43, and hydraulic chambers 45 and 46 are individually formed in a hole surrounded by the rear end surface of each of the plungers 44a and 44b and the inner sleeve 39. Hereinafter, of these symmetrical four hydraulic chambers 45 and 46, two located at the rear side in the clockwise direction relative to the chamber 41 are referred to as first hydraulic chambers 45, and two located at the front side in the clockwise direction relative to the chamber 41 are referred to as second hydraulic chambers 46.

As shown in FIG. 2, a first annular passage 48 is disposed at an upper portion of the outer peripheral surface of the inner sleeve 39, and a second annular passage 49 is disposed at a lower portion of the inner sleeve 39. As shown in FIG. 3, the first annular passage 48 communicates with the two firs hydraulic chambers 45 through first hole passages 50a individually disposed in the inner sleeve 39 at positions corresponding to the individual first hydraulic chambers 45. The second annular passage 49 communicates with the two second hydraulic 46 through second hole passages 50b disposed in the inner sleeve 39 at positions corresponding to the individual second hydraulic chambers 46.

As shown in FIG. 2, a first annular passage 51 is disposed at an upper portion of the outer peripheral surface of the outer sleeve 40, and a second annular passage 52 is disposed at lower portion of the outer peripheral surface of the outer sleeve 40. In the Figure, numeral 53 indicates O-rings for oil passage sealing individually disposed at an upper stage of the first annular passage 51, between the first annular passage 51 and the second annular passage 52, and at a lower stage of the second annular passage 52.

As shown in FIG. 3, the first annular passage 51 of the outer sleeve 40 communicates with a first inlet/outlet port body 54 formed on the casing 3, and the second annular passage 52 of the outer sleeve 40 communicates with a second inlet/outlet port body 55 formed on the casing 3.

The first inlet/outlet port body 54 and the second inlet/outlet port body 55 are connected individually to the other outlet portion 31b of the splitter unit 31 through first and second control valves 58 and 59 individually comprising passages 56 and 57 and a pressure control valve and a splitter unit 60 (one inlet unit 60a and two outlet units 60b and 60b connected with passages 60c and 60c having orifices), and hydraulic pressure from the oil pump 33 divided by the splitter units 31 and 60 is supplied to the inlet/outlet port body 54 or the inlet/outlet port body 55 by the operation of the first and second control valves 58 and 59. Return portions of the individual control valves 58 and 59 are connected to the oil reservoir 35.

The first annular passage 48 of the inner sleeve 39 and the first annular passage of the outer sleeve 40 communicate with each other through first communication holes 61 and 61 provided in the outer sleeve 40. Furthermore, the second annular passage 49 of the inner sleeve 39 and the second annular passage 52 of the outer sleeve 40 communicate with each other through second communication holes 62 and 62 provided in the outer sleeve 40.

Operation of the first and second control valves 58 and 59 in the plunger driving means 64 of the above structure and action of hydraulic pressure to the first and second hydraulic chambers 45 and 46 will be described. FIGS. 5(a), (b), and (c) schematically show the action of hydraulic pressure to the first and second hydraulic chambers 45 and 46, and FIGS. 6(a), (b), and (c) schematically show the operation of the plungers 44a and 44b corresponding to FIG. 5.

When the first and second control valves 58 and 59 are not operated, no hydraulic pressure is applied to the first hydraulic chamber 45 and the second hydraulic chamber 46.

Figure 6C:
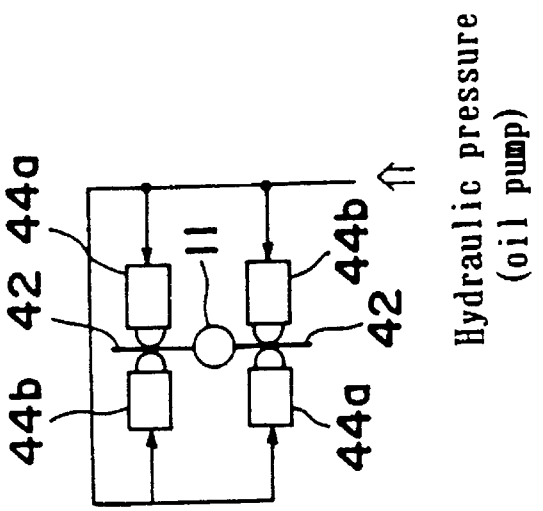
FIG. 6 is a schematic view showing operation of a plunger corresponding to FIG. 5.
Figure 6A:
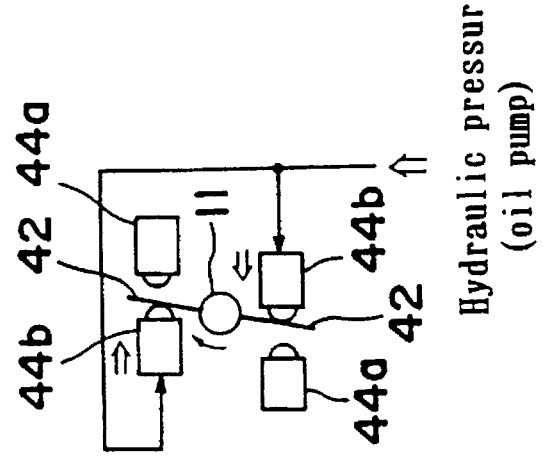
Figure 24:
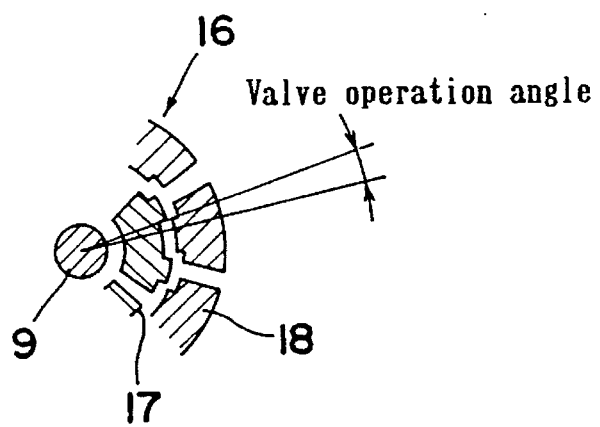
FIG. 24 is a schematic sectional view showing condition when operation angle of a rotary valve changes to the advance side.

When only the first control valve 58 is operated, as shown in FIG. 5(a) and FIG. 6(a), hydraulic oil from the oil pump 33 is supplied to the hydraulic chamber 45, and the plunger 44a presses the pressed portion 42, for example, to generate in the torsion bar 9 a torsional moment in the forward direction (right direction) of the rotary valve 16, that is, as shown in FIG. 24, to slightly increase the valve operation angle of the rotary valve 16.

Figure 6B:
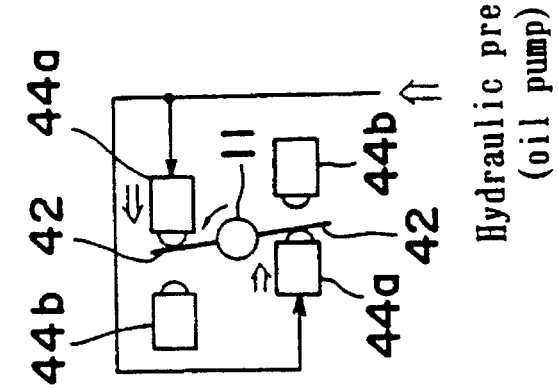

When only the second control valve 59 is operated, as shown in FIG. 5(b) and FIG. 6(b), hydraulic oil from the oil pump 33 is supplied to the second hydraulic chamber 46, and the plunger 44b presses the pressed portion 42, for example, to generate in the torsion bar 9 a torsional moment in the reverse direction (left direction) of the rotary valve 16.

Therefore, the first and second control valves 58 and 59 can be selected to generate an independent torsional moment in the torsion bar 9.

When the first and second control valves 58 and 59 are operated, as shown in FIG. 5(c) and FIG. 6(c), hydraulic oil simultaneously being driven from the oil pump 33 is supplied to the first and second hydraulic chambers 45 and 46, and the plungers 44a and 44b press the pressed portion 42 from both sides. This enhances the equivalent rigidity of the torsion bar 9, for example, to improve response and stability of the steering wheel 13 in the vicinity of the neutral position.

Figure 7:
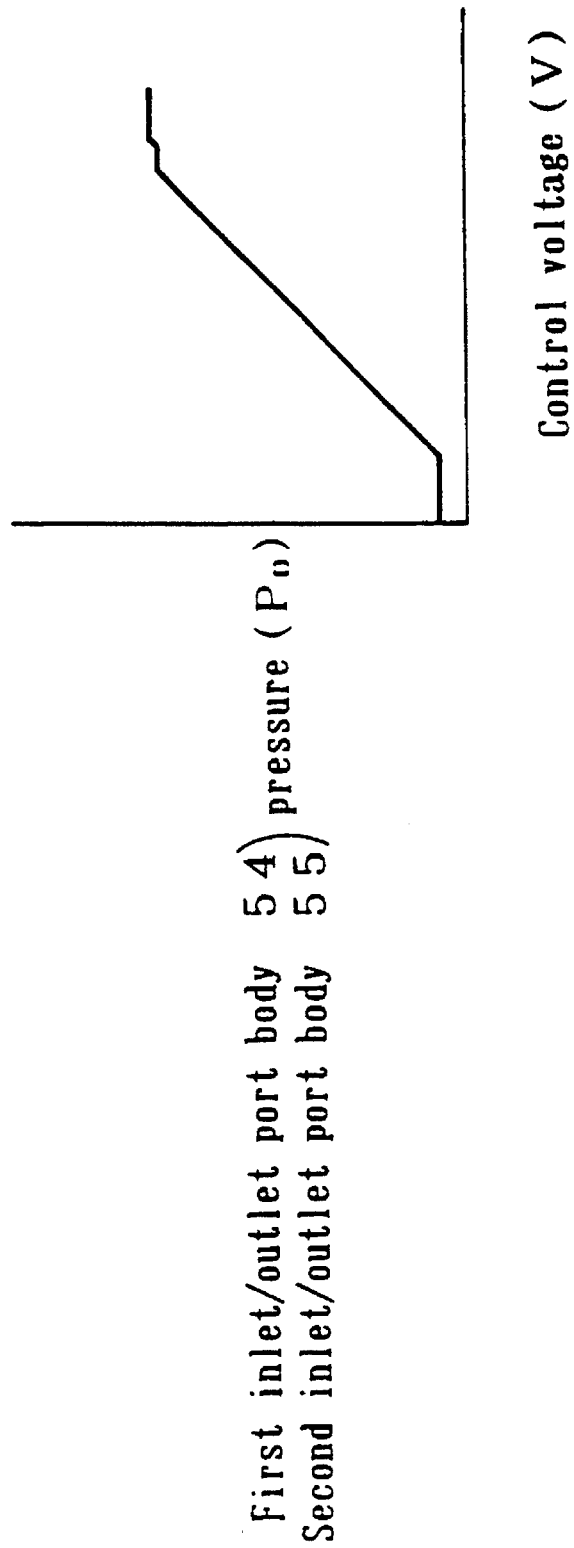
FIG. 7 is a graph showing a characteristic map of discharge pressure according to a control voltage of a control valve.

The first and second control valves 58 and 59 use a control valve of a type which increases pressure supplied to the first and second inlet/outlet port bodies 54 and 55 as a control voltage (V) increases, as shown in a map shown in FIG. 7.

Solenoid units 58a and 59a of the first and second control valves 58 and 59 are connected to a control unit (ECU) 70 as control means comprising a microcomputer and its peripheral circuits. ECU 70 is connected with a vehicle speed sensor 71 for detecting a traveling speed of the vehicle (vehicle speed: Vel), a steering wheel angle sensor 72 for detecting steering angle (oh) of the steering wheel 13, and a torque sensor 73 for detecting a torque (steering torque: tq2) applied to the steering wheel 13.

With this control system, the range of a target assist force is set by an assist force obtained by rotating the rotary valve 16 in the same direction as the torsion direction of the torsion bar 9 and an assist force obtained by rotating the rotary valve 16 in the direction reverse to the torsion direction of the torsion bar 9, the plungers 44a and 44b are driven to obtain the assist force, generating a torsional moment required for the torsion bar 9.

ECU 70 is set with a function to determine that the steering wheel 13 is operated in the forward (right) direction or the reverse (left) direction and a function to determine a target torque necessary for the operation of the steering wheel 13 at this time. This enables setting a range of target assist force, that is, an assist force region which is obtained by combining an assist force obtained by the torsion bar 9 distorted by steering the steering wheel 13 with an assist force obtained by rotating the rotary valve 16 in the direction reverse to the torsion direction of the torsion bar 9.

Furthermore, ECU 70 is set with a function to determine whether a mode to control the steering force of the steering wheel 16 or a centering mode to maintain the steering wheel 13 at its neutral position is to be set, and a function to calculate the control voltage of the solenoid units 58a and 59a.

ECU 70 is also set with a function to determine the current variation (steering wheel angular velocity: Oh') in steering wheel angle of the steering wheel 13, a function to operate the first control valve 58 according to the calculation result (to generate a torsional moment in the torsion bar 9 in the same direction as the relative dislocation of the rotary valve 16), and a function to operate the second control valve 59 according to the calculation result (to generate a torsional moment in the torsion bar 9 in the direction reverse to the relative dislocation of the rotary valve 16). This drives the plungers 44a and 44b to generate the target assist force, thereby generating a necessary torsional moment in the torsion bar 9.

Next, control operation in ECU 70 will be described in detail with reference to FIGS. 8 to 21. FIGS. 8 to 20 show control flow charts of the power steering apparatus, and FIG. 21 shows a timing chart of the power steering apparatus in a low-speed side assist control.

ECU 70 is started to operate by an ON signal of an ignition key switch (IG).

Initial value setting is performed in step S1, in which individual control flags are set to 0 (non-execution side), and all variables set to 0 and various coefficients are set to predetermined values.

A neutral signal (Hc signal) of the steering wheel 13 is read in step S2, and steering wheel angle Oh detected from the steering wheel angle sensor 72 is read in step S3. After that, the steering wheel angle Oh is calculated in a steering wheel angle calculation routine in step S4.

The steering wheel angle calculation routine in step S4 will be described with reference to FIG. 13. In step S4, the steering wheel angle Oh is 0 until the Hc value of the steering wheel 13 is ON to secure safety when IG becomes ON with the steering wheel steered to a large steering angle.

Figure 13:
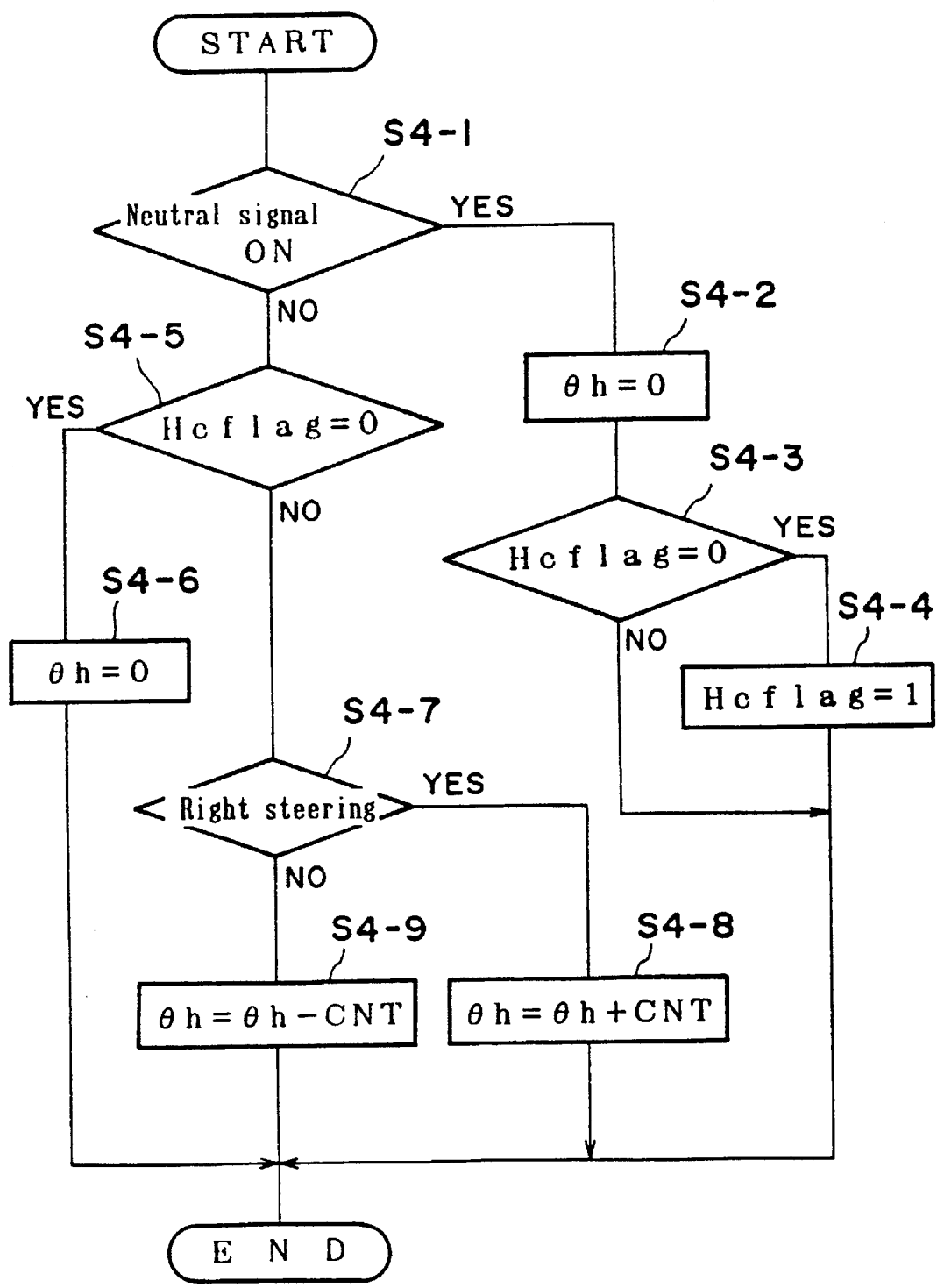
FIG. 13 is a control flow chart of the power steering apparatus.

As shown in FIG. 13, determination is made in step S4-1 as to whether or not the Hc value is ON, when the Hc value is determined to be ON, the steering wheel angle Oh is set to 0 in step S4-2, and the status of a steering wheel neutral flag Hcflag is determined in step S4-3. When it is determined in step S4-3 that Hcflag=0, that is, the steering wheel 13 is not neutral, Hcflag=1 is set in step S4-4, that is, the steering wheel 13 is determined to be neutral, and the processing returns to the main flow chart. When it is determined in step S4-3 not to be Hcflag=0, the processing returns, as is, to the main flow chart.

On the other hand, when it is determined in step S4-1 that the Hc value is not ON, determination is made in step S4-5 as to whether or not Hcflag=0, and when Hcflag=0, the steering wheel angle Oh is set to 0 in step S4-6, and the processing returns to the main flow chart. When it is determined in step S4-5 not to be Hcflag=0, determination is made in step S4-7 as to whether the steering wheel 13 is right steering or left steering. When it is right steering, the read value is added to the steering wheel angle Oh (Oh=Oh+CNT) in step S4-8, and the processing returns to the main flow chart. When it is left steering, the read value is subtracted from the steering wheel angle Oh (Oh=−CNT) in step S4-9, and the processing returns to the main flow chart.

In step S4, the steering wheel angle Oh is set to 0 until the Hc value finally becomes ON, to disable control start condition in the subsequent processing.

Figure 8:
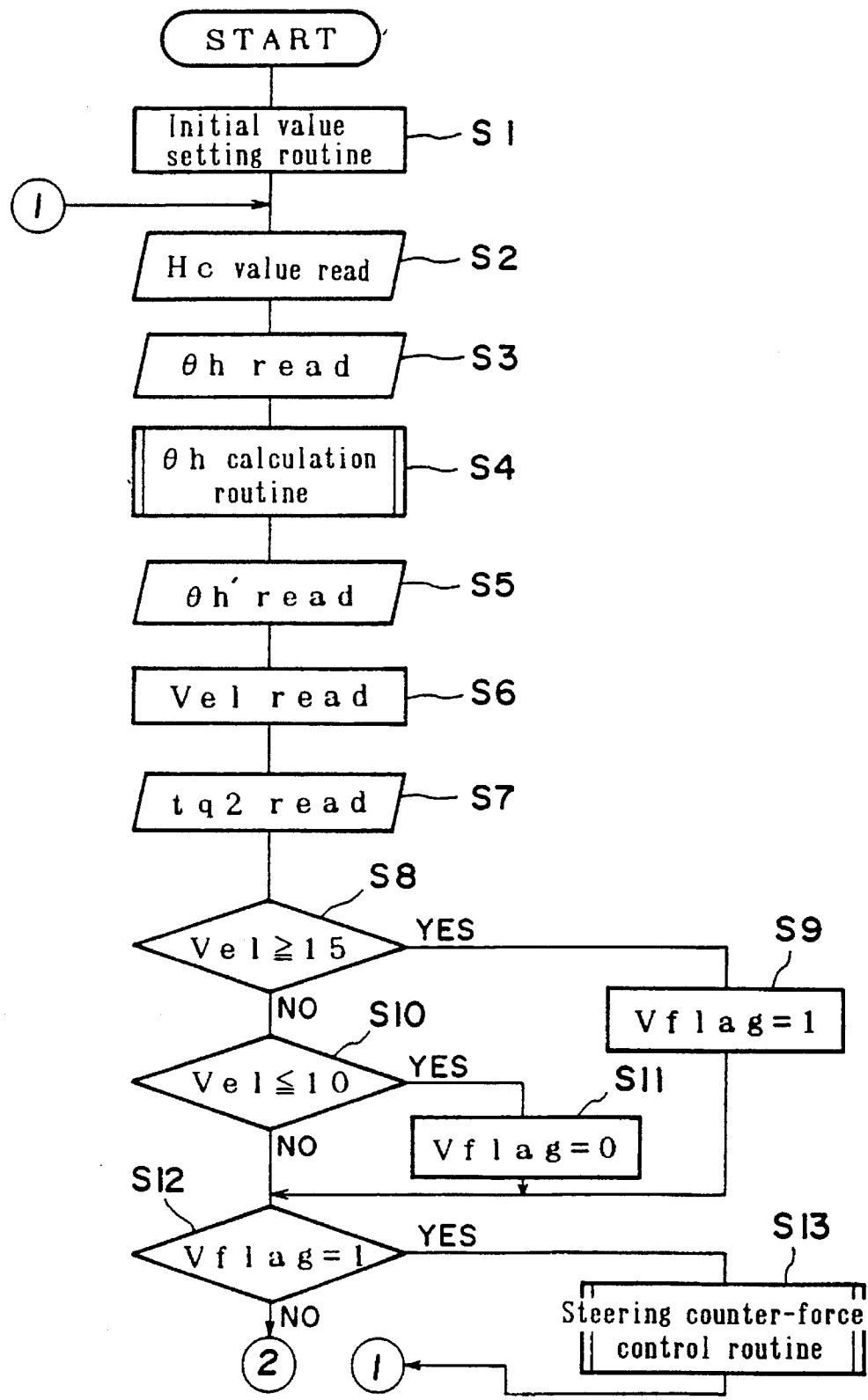
FIG. 8 is a control flow chart of the power steering apparatus.

Reverting back to the main flow chart, as shown in FIG. 8, the steering wheel angular velocity Oh', the vehicle speed Vel detected by the vehicle speed sensor 71, and the steering torque tq2 detected by the torque sensor 73 are read in steps S5, S6, and S7.

Determination is made in step S8 as to whether or not the vehicle speed Vel is 15 km/h or more, and when the vehicle speed Vel is 15 km/h or more, vehicle speed flag Vflag=1 is set in step S9 to make counter-force control at the high-speed executable. When it is determined in step S8 that the vehicle speed Vel is less than 15 km/h, determination is made in step S10 as to whether or not the vehicle speed Vel is 10 km/h or less. When the vehicle speed Vel is 10 km/h or less, vehicle speed flag Vflag=0 is set in step S11 to make low-speed side control executable. After setting the vehicle speed flag Vflag to 0 or 1 in step S9 or step S11, vehicle speed flag Vflag status is determined, and when the vehicle speed flag Vflag =1, a steering counter-force control routine (described later) shown in FIG. 9 for high-speed traveling is executed in step S13. When it is not Vflag=1, the main flow chart is executed.

When the vehicle speed Vel is 10 km/h or less, low-speed side control is executed and, depending on the operation condition, a centering control function to assist the steering wheel 13 to be maintained at the neutral position or a steering force control function to assist the steering force of the steering wheel 13 is executed.

Figure 9:
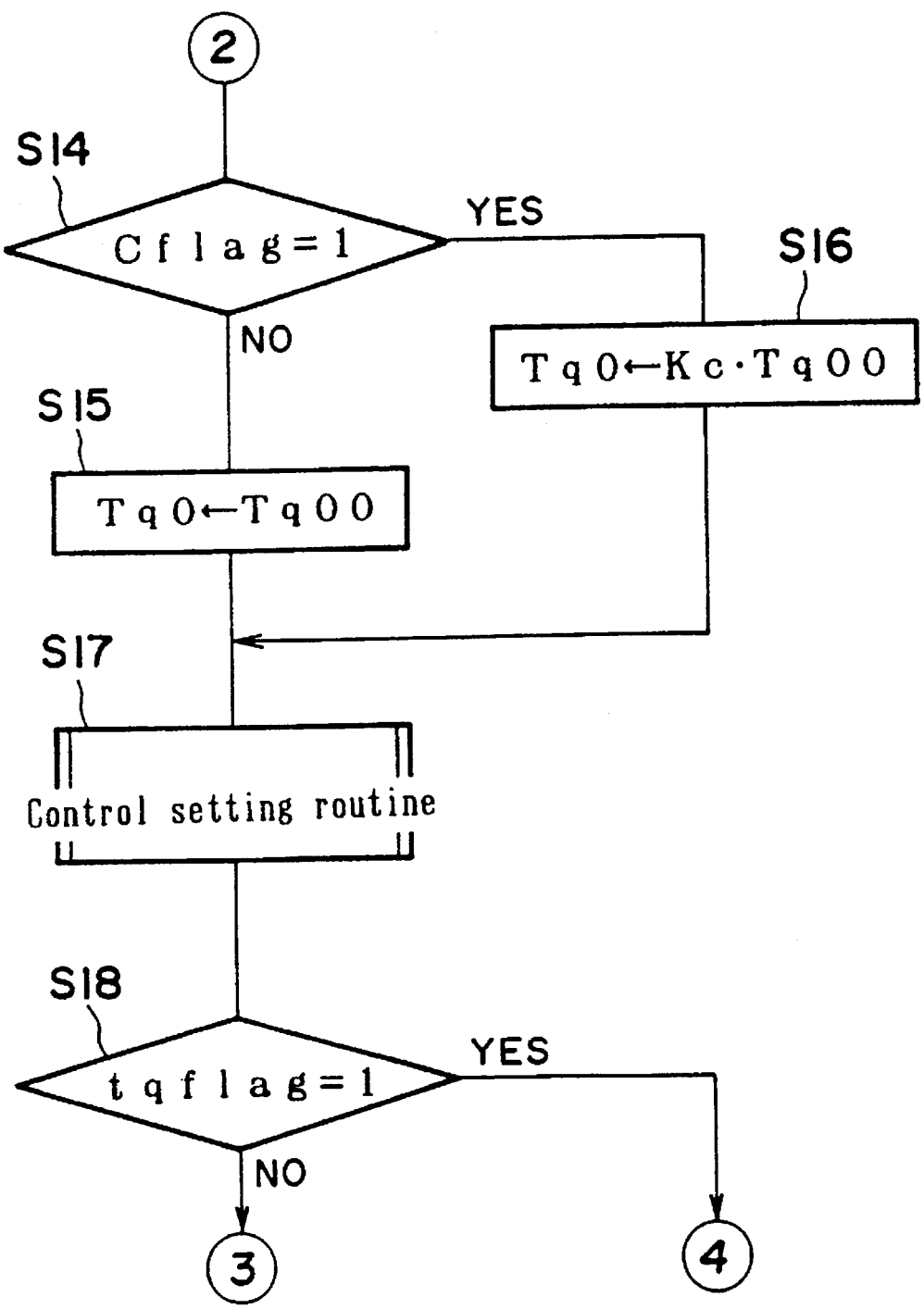
FIG. 9 is a control flow chart of the power steering apparatus.

As shown in FIG. 9, determination is made in step S14 as to whether or not under centering control function, that is, whether the centering flag, Cflag=1. When it is not Cflag=1, in step S15, a control determination torque threshold value Tq0 of the steering torque tq2 is set to a predetermined value Tq00. When centering flag Cflag−1, in step S16, the control determination torque threshold value Tq0 for the steering torque tq2 is set to Kc Tq00, which is the predetermined value Tq00 multiplied by a factor Kc.

In the control means of the present invention, the control determination torque threshold value Tq0 (KC Tq00) for the execution determination of the centering control function is set greater than the control determination torque threshold value Tq0 (Tq00) for the execution determination of the steering force control function.

Thus, as shown in FIG. 21(b) (by dot-bar line), during the centering control function (Cflag=1), the control determination torque threshold value Tq0 is increased so that even if the steering torque tq2 becomes largely in the reverse direction due to inertia or the like of the steering wheel 13, the steering torque tq2 falls in the range of the control determination torque threshold value Tq0 to continue the centering control function.

After the control determination torque threshold value Tq0 of the steering torque tq2 in the steering force control function or centering control function is set in step S15 or step S16, determination is made in the control setting routine of step S17 as to whether the steering force control function or the centering control function is to be executed.

The control setting routine in step S17 will be described with reference to FIG. 14. In step S17, determination is made as to whether the steering force control function is executed (steering force control function flag tqflag=1) or the steering force control function flag is reset (tqflag=0) to enable the centering control function.

Figure 14:
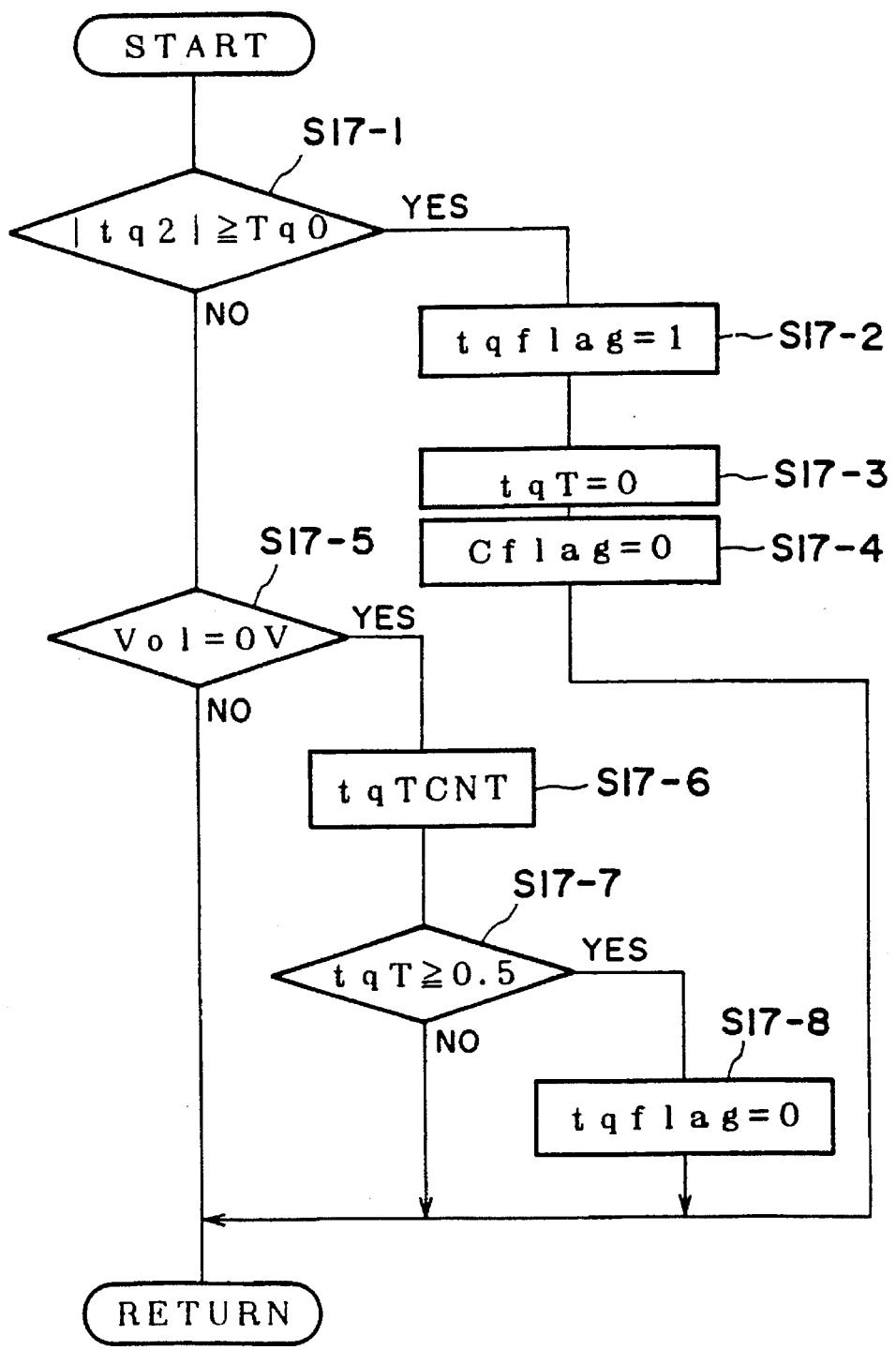
FIG. 14. is a control flow chart of the power steering apparatus.

As shown in FIG. 14, determination is made in step S17-1 as to whether or not an absolute value |tq2| of the steering torque is not smaller than the control determination torque threshold value Tq0. Since it is determined not to be Cflag=1 immediately after the operation start, the control determination torque threshold value Tq0 is the setting value Tq00.

When the absolute value |tq2| of the steering torque tq2 is not less than the control determination torque threshold value Tq0, the steering force control function flag tqflag is set to 1 in step S17-2 to enable the steering force control function. Then, a control timer tqT is set to 0 in step S17-3 and Cflag=0 is set in step S17-4 to reset the centering control function, and the processing returns to the main flow chart.

When it is determined in step S17-1 that the absolute value |tq2| of the steering torque tq2 is smaller than the control determination torque threshold value Tq0, determination is made in step S17-5 as to whether or not an instruction control voltage Vol to the solenoid units 58a and 59a to operate the first ad second control valves 58 and 59 is 0. When the instruction control voltage Vol is already outputted, the processing returns to the main flow chart. When it is determined in step S17-5 that the instruction control voltage Vol is 0, the control timer tqT is counted (tqTCNT) in step S17-6, and determination is made in step S17-7 as to whether or not the control time tqT value is 0.5 seconds or more. When the control timer tqT does not reach 0.5 seconds, the processing returns to the main flow chart. When the control timer tqT is 0.5 seconds or more, the steering force control function flag tqflag is reset (tqflag=0) in step S17-8 to enable the centering control function, and the processing returns to the main flow chart.

In the control means of the present invention, the centering control function is set so that the centering control function is performed when the steering torque tq2 of the steering wheel 13 at a value within the control determination torque threshold value Tq0 (±Tq0) continues for a predetermined period of time, that is, 0.5 seconds.

Thus, the centering control function becomes executable when the instruction control voltage Vol is 0V and the condition where the absolute value |tq2| of the steering torque tq2 is smaller than the control determination torque threshold value Tq0 exists for 0.5 seconds or longer (an area A in FIG. 21). The steering force control function immediately becomes executable when the absolute value |tq2| of the steering torque tq2 is not smaller than the control determination torque threshold value Tq0.

With this control, even when the steering torque tq2 becomes temporarily smaller than the control determination torque threshold value Tq0 due to a variation in torque during the operation of the steering wheel 13, if it is for a short time (less than 0.5 seconds), the mode does not shift to the centering control function. Furthermore, since, when the steering torque tq2 becomes smaller than the control determination torque threshold value Tq0 it can momentarily shift to the steering force control function, the steering wheel 13 can be immediately stopped even under the centering control function.

Figure 10:
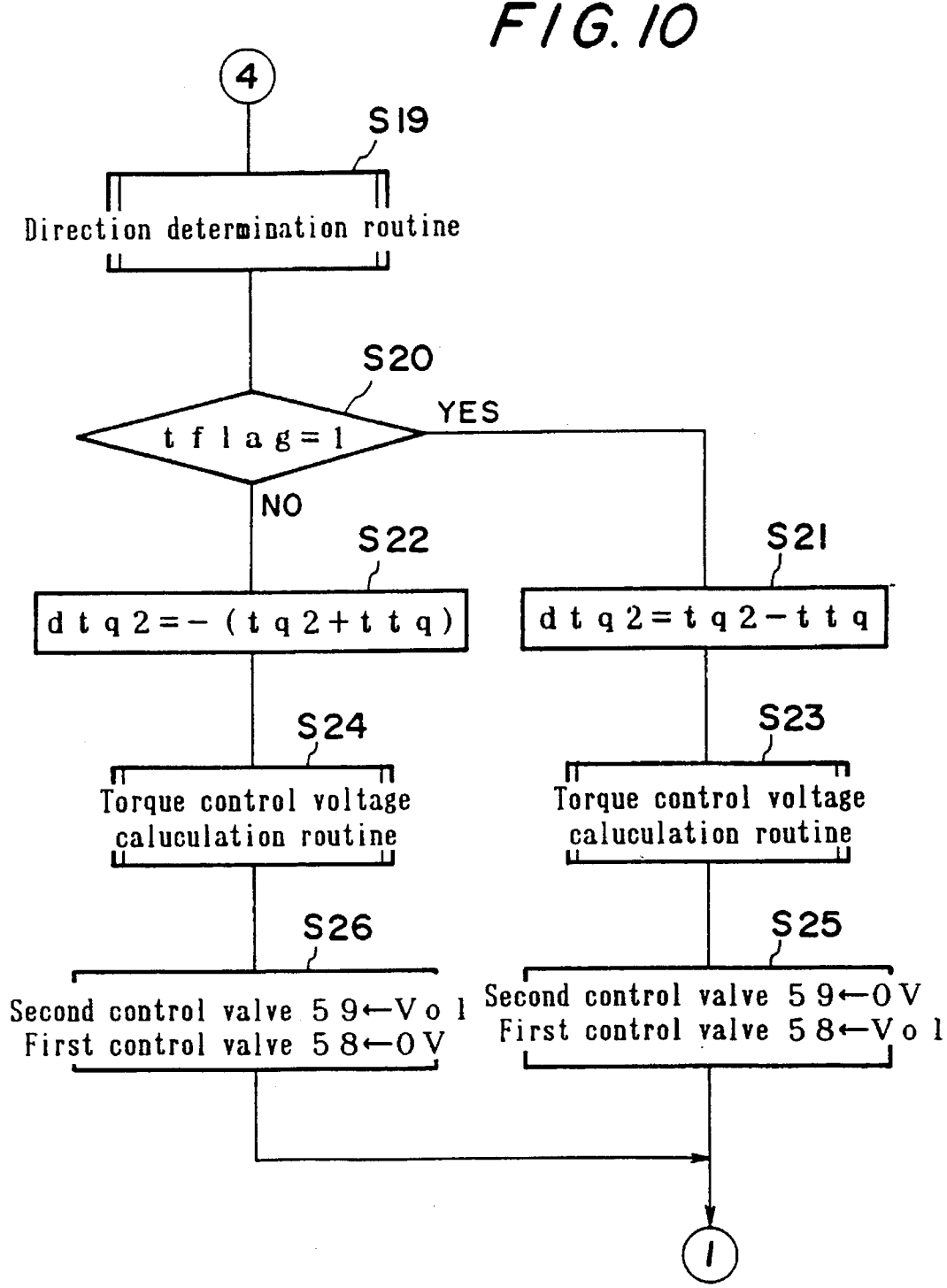
FIG. 10 is a control flow chart of the power steering apparatus.
Figure 11:
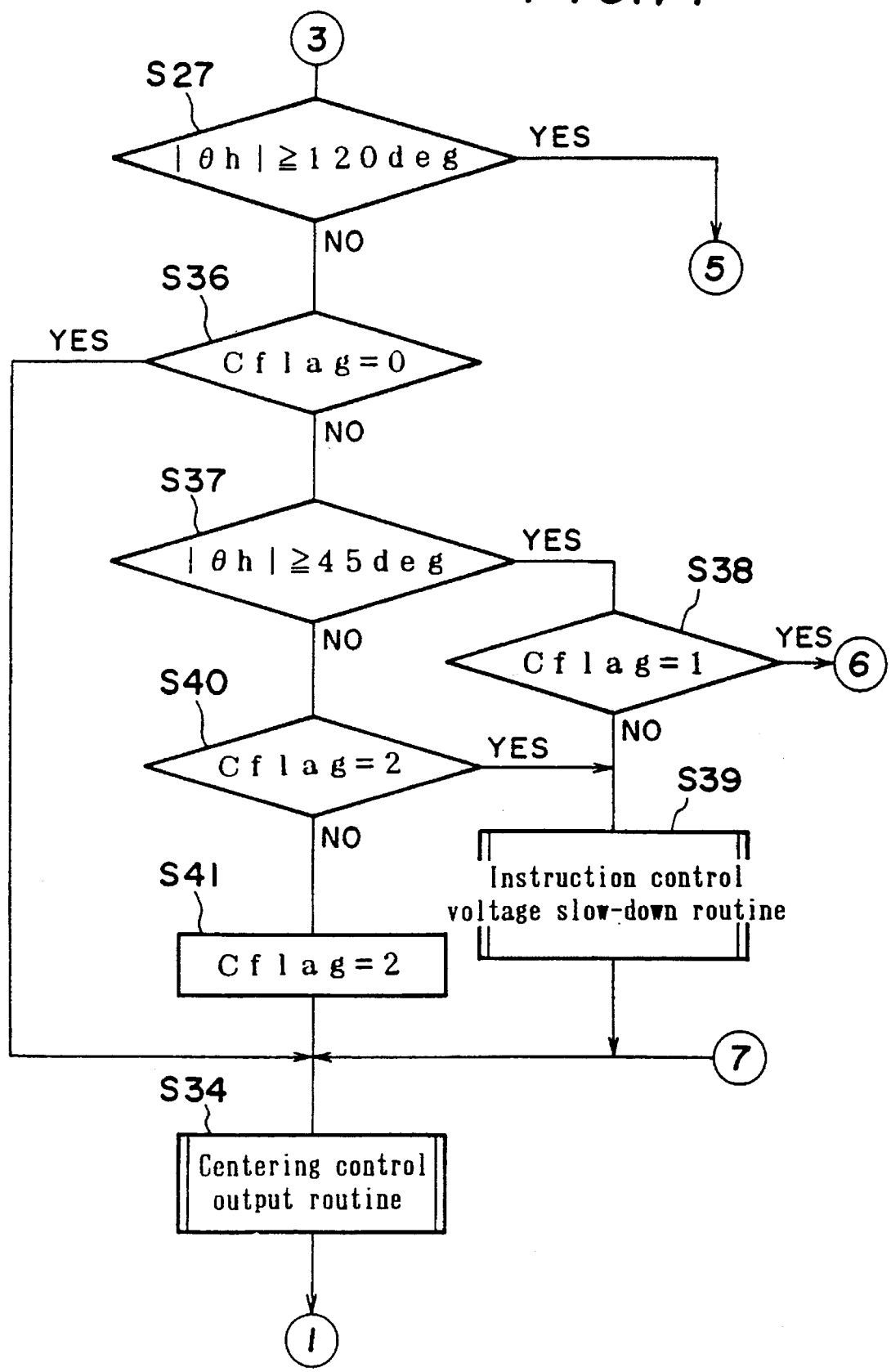
FIG. 11 is a control flow chart of the power steering apparatus.
Figure 12:
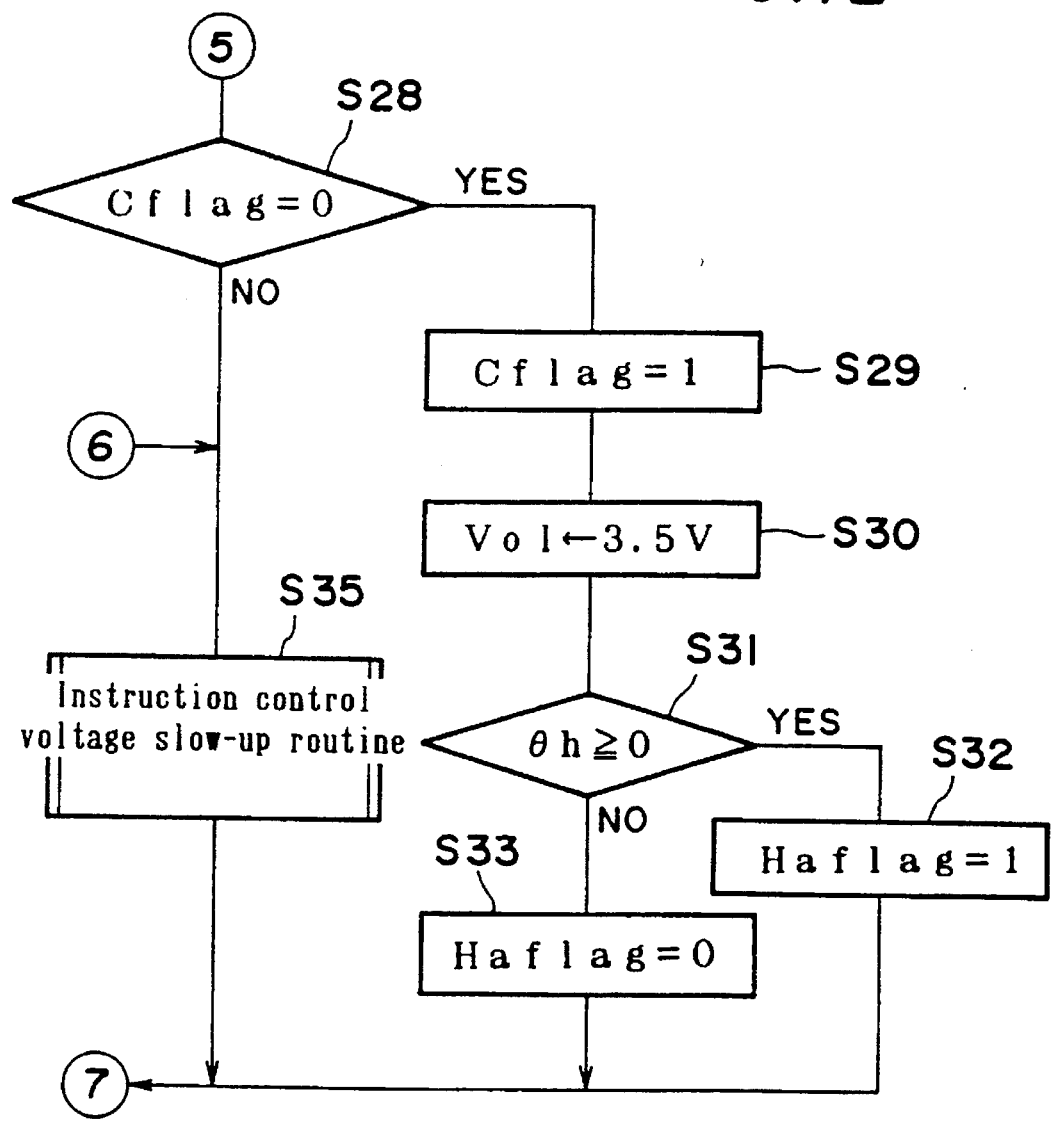
FIG. 12 is a control flow chart of the power steering apparatus.

After the control setting routine is executed in step S17, determination is made in step S18 as to whether or not the steering force control function flag tqflag=1, and when the steering force control function flag tqflag=1, the steering force control function shown in FIG. 10 is executed. When the steering force control function flag is not tqflag=1 that is, the steering force control function flag is tqflag=0, the centering control function shown in FIG. 11 and FIG. 12 is executed.

The steering force control function shown in FIG. 10 will now be described. When it is determined in step S18 of FIG. 9 that the steering force control function flag is tqflag=1, the steering direction is determined in the direction determination routine of step S19.

The direction determination routine in step S19 will be described with reference to FIG. 15. In the determination of the steering direction in step S19, the steering torque tq2 is determined from the control determination torque threshold value (±Tq0) in the reverse direction, and the steering wheel angular velocity θh' is determined from the steering wheel angular velocity in the reverse direction.

Figure 15:
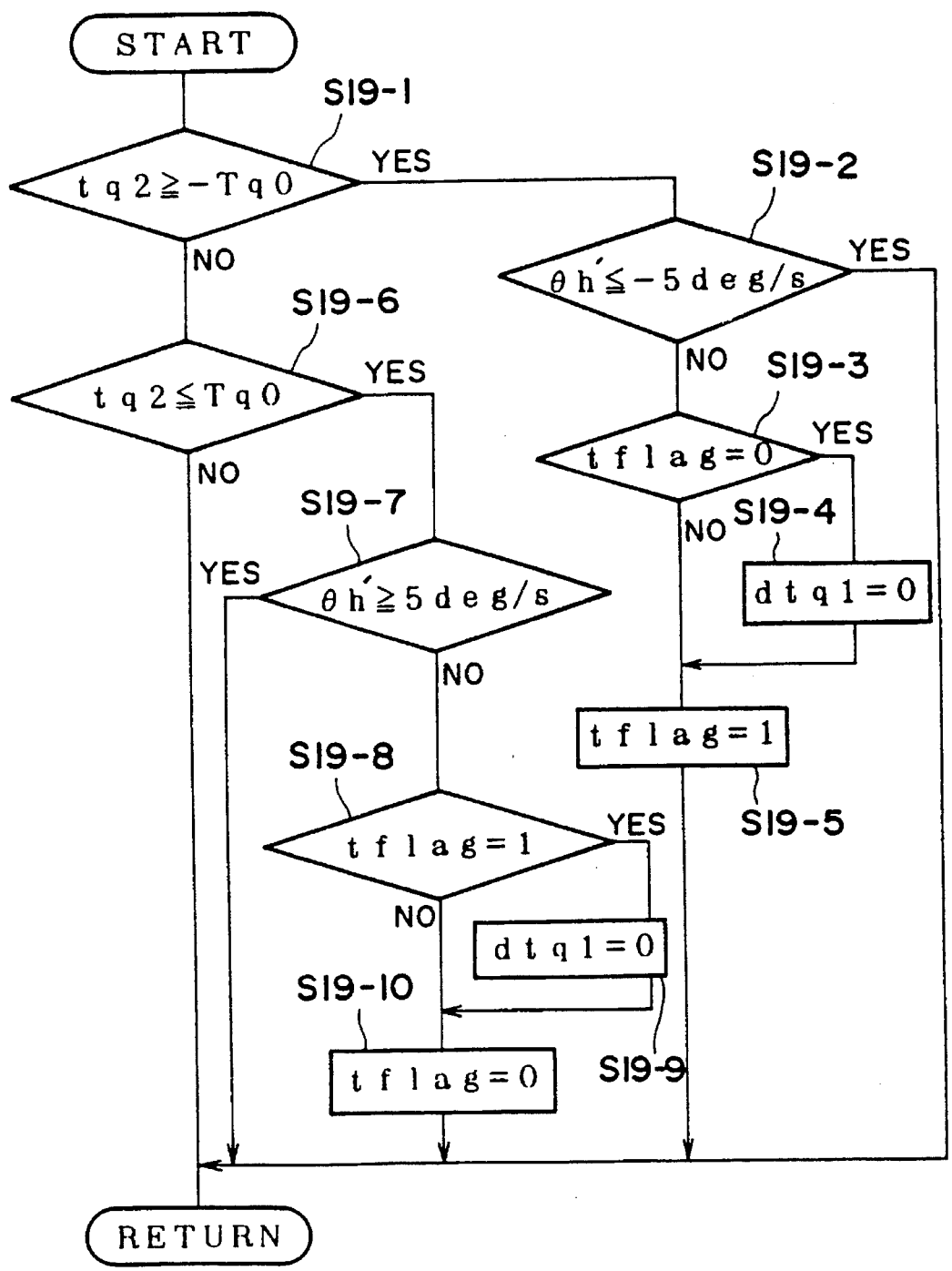
FIG. 15 is a control flow chart of the power steering apparatus.

As shown in FIG. 15, determination is made in step S19-1 as to whether or not the steering torque tq2 is −Tq0 (control determination torque threshold value of the negative side) or more. When the steering torque tq2 is not less than the negative side control determination torque threshold value −Tq0 (towards the positive side), it is determined as right steering, and determination is made in step S19-2 as to whether or not the steering wheel angular velocity θh' is −5 deg/s or less.

Since, when it is actually right steering, the steering wheel angular velocity θh' is greater than −5 deg/s, determination is made in step S19-3 as to whether or not a steering direction flag tflag=0 (left steering), and when the steering direction flag is tflag=0, a torque difference dtql (initial value set to 0) from the previous target steering torque (described later) is set to 0 in step S19-4, and the steering direction flag tflag=1 is set in step S19-5 for right steering control. When it is not right steering, the steering wheel angular velocity is θh'≦−5 deg/s, and the processing returns to the main flow chart. When it is determined in step S19-1 that the steering torque tq2 is smaller than the negative side control determination torque threshold value −Tq0, determination is made in step S19-6 as to whether or not the steering torque tq2 is not greater than the positive side control determination torque threshold value Tq0. When the steering torque tq2 is not greater than the positive side control determination torque threshold value Tq0 (towards the negative side), it is determined to be a left steering condition, and determination is made in step S19-7 as to whether or not the steering wheel angular velocity θh' is 5 deg/s or more. When it is determined in step S19-6 that the steering torque tq2 is not greater than the positive side control determination torque threshold value Tq0, and when then it is determined in step S19-7 that the steering wheel angular velocity θh' is 5 deg/s or more, it is not a left steering condition, and thus the processing returns to the main flow chart.

Since the steering wheel angular velocity θh' is smaller than 5 deg/s when it is actually in a left steering condition, determination is made in step S19-8 as to whether or not the steering direction flag is tflag=1 (right steering), and when the steering direction flag tflag=1, the torque difference dtq1 is set to 0 in step S19-9, and the steering direction flag tflag=0 is set for left steering control in step S19-10. When it is determined in step S19-8 that the steering direction flag is not tflag=1, nothing is made, and the steering direction flag tflag=0 is set in step S19-10 for left steering control.

Figure 22:
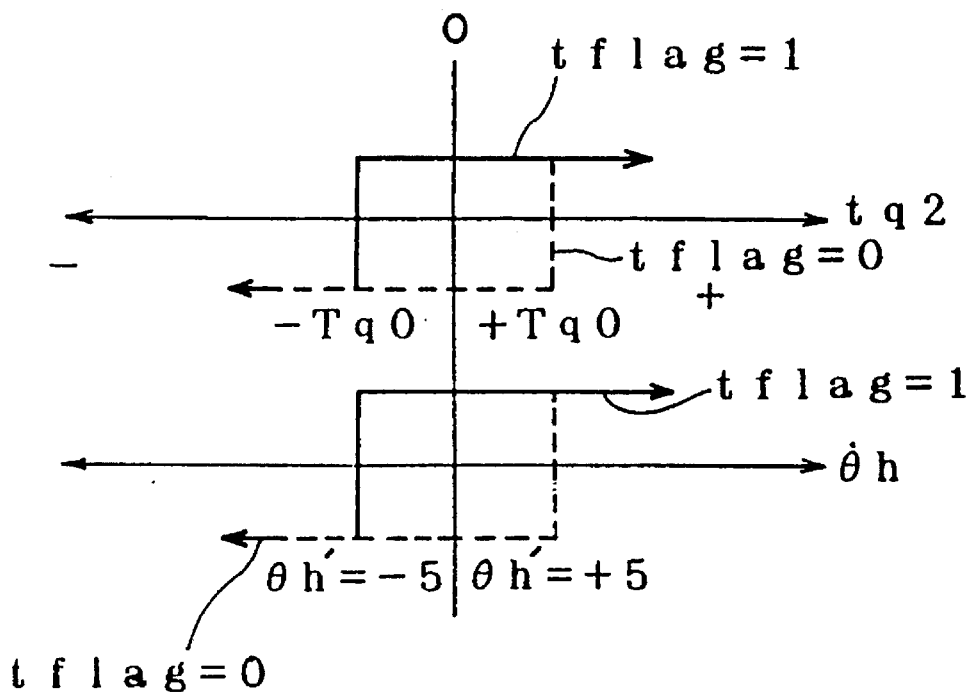
FIG. 22 is a chart explaining a steering torque determination condition.

Thus, when the steering direction flag tflag=0 is set for left steering control, as shown by the dotted line in FIG. 22, determination of the steering torque tq2 is made with the control determination torque threshold value Tq0 at the right steering side, and determination of the steering wheel angular velocity θh' is made with the positive value of steering wheel angular velocity at the right steering side.

The steering force control function of the present invention is provided with means for determining the steering torque tq2 from the control determination torque threshold value tq0 in the reverse steering direction and for determining a steering wheel angular velocity θh' from the steering wheel angular velocity θh' in the reverse direction when determining the steering direction.

Therefore, in determining the steering direction of steering force control, since determination of the steering torque tq2 is made with the control determination torque threshold value (±Tq0) in the reverse direction, and determination of the steering wheel angular velocity θh' is made with the value of the steering wheel angular velocity in the reverse direction, even when the steering torque tq2 and the steering wheel angular velocity θh' temporarily vary to positive or negative values because of fluctuations in the steering torque and the steering wheel angular velocity θh' due to various external disturbance and noise, the steering direction will not change repeatedly (hunting phenomenon), enabling quick changes in steering direction. Use of a filter circuit is considered to eliminate such a hunting phenomenon, however, this causes a delay in the determination of steering direction.

Reverting back to the main flow chart, after steering direction is determined in the direction determination routine in step S19, determination is made in step S20 as to whether or not the steering direction flag is tflag=1. The torque difference dtq2 between a target steering torque ttq and the steering torque tq2 is calculated in step S21 (tflag=1) or step S22 (tflag=0) depending on the steering direction.

The target steering torque ttq in the low-speed side steering force control is a predetermined value, which is set in step S1 and FIG. 8.

In right steering (steering direction flag tflag=1), the torque difference dtq2 is determined by subtracting the value of target steering torque ttq from the value of steering torque tq2 in step S21. In left steering (steering direction flag tflag=0), the torque difference dtq2 is determined by adding the value of target steering torque ttq to the value of steering torque tq2 to make it a negative condition.

After the torque difference dtq2 is calculated according to the steering direction, the instruction control voltages Vol outputted to the first and second control valves 58 and 59 are calculated in a torque control voltage calculation routine in step S23 and step S24. Step S23 and step S24 are to perform the same processing.

The torque control voltage calculation routine in step S23 and step S24 will be described with reference to FIG. 16. In the determination of instruction control voltage Vol in step S23 and step S24, when the torque difference dtq2 from the target steering torque ttq is a positive value greater than the previous torque difference dtq1, the instruction voltage Vol is increased, and when it is smaller than the previous value, the instruction control voltage Vol is decreased with the passage of time.

Figure 16:
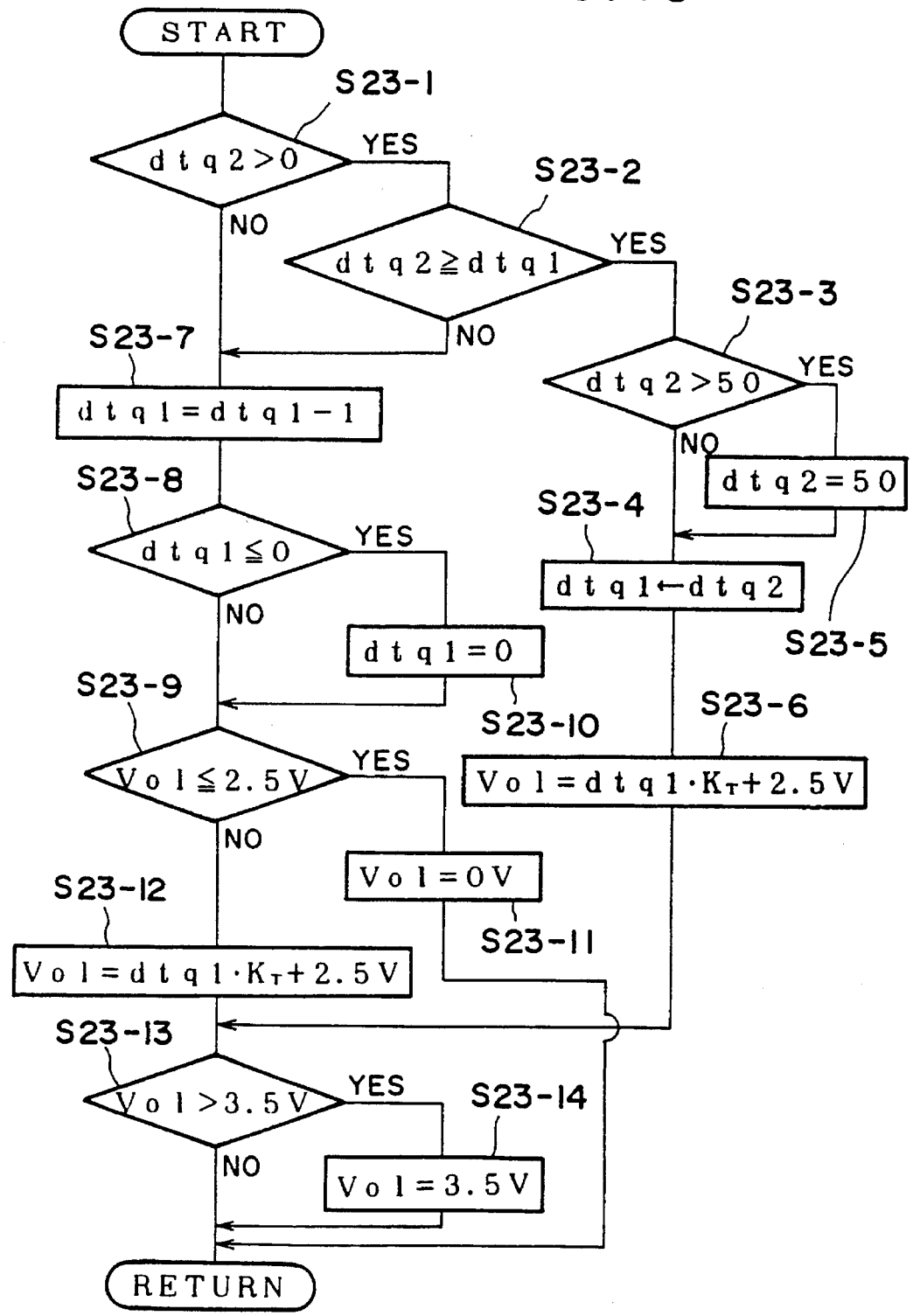
FIG. 16 is a control flow chart of the power steering apparatus.

As shown in FIG. 16, determination is made in step S23-1 as to whether or not the torque difference dtq2 is a positive value, and when it is a positive value, the torque difference dtq2 and the previous torque difference dtq1 (for the first time, dtq1 is set to 0) are compared in step S23-2. When it is determined in step S23-2 that the torque difference dtq2 is equal to or greater than the previous torque difference dtq1, determination is made in step S23-3 as to whether or not the torque difference dtq2 exceeds 50, and an upper limit 50 of the torque difference dtq2 is set. When the torque difference dtq2 is 50 or less, the processing, as is, goes to step S23-4. When the torque difference dtq2 exceeds 50, the torque difference dtq2 is set to 50 in step S23-5, and the processing goes to step S23-4. In step S23-4, dtq1 is replaced with dtq2 to set the value of the torque difference dtq2 as the torque difference dtq1. Then, in step S23-6, the torque difference dtq1 is multiplied by a torque control proportional coefficient KT, and a voltage of 2.5 V of dead zone of the first and second control valves 58 and 59 is added to obtain the instruction control voltage Vol.

When it is determined in step S23-1 that the torque difference dtq2 is a negative value, or when it is determined in S23-2 that the torque difference dtq2 is smaller than the previous torque difference dtq1, the previous torque difference dtq1 is decreased by 1 point in step S23-7. Since it is necessary to maintain the previous torque difference dtq1 at a positive value, determination is made in step S23-8 as to whether or not the previous torque difference dtq1 is a positive value. When the previous torque difference dtq1 is a positive value, the process, as is, goes to step S23-9. When it is a negative value, the previous torque difference dtq1 is set to 0, and the processing goes to step S23-9. Determination is made in step S23-9 as to whether or not the instruction control voltage Vol is 2.5 V or less, and when it is 2.5 V or less, the instruction control voltage Vol is replaced with 0V in step S23-11, and the processing returns to the main flow chart. When it is determined in step S23-9 that the instruction control voltage Vol exceeds 2.5 V, the torque difference dtq1 is multiplied with the torque control proportional coefficient KT in step S23-12, and the voltage of 2.5 V of dead zone of the first and second control valves 58 and 59 is added to obtain the instruction control voltage Vol.

After the instruction control voltage Vol is calculated in step S23-6 and step S23-12, determination is made in step S23-13 as to whether or not the instruction control voltage Vol exceeds 3.5 V, and an upper limit of the instruction control voltage Vol is set. When the instruction control voltage Vol is 3.5 V or less, the processing, as is, returns to the main flow chart and when the instruction control voltage Vol exceeds 3.5 V, the instruction control voltage Vol is set to 3.5 V, and the processing returns to the main flow chart.

Thus, when the torque difference dtq2 is a positive value greater than the previous torque difference dtq1, the upper limit of the value is set to 50 and the instruction control voltage Vol is calculated, and when the torque difference dtq2 is a negative value, the previous torque difference dtq1 is decreased by 1 point to calculate the instruction control voltage Vol, so that the instruction control voltage Vol is increased only when the difference from the target steering torque ttq is large due to variations in the steering torque tq2 during steering, and when the difference is negative, the instruction control voltage Vol is gradually decreased with the passage of time.

With this control, variation frequency of the instruction control voltage Vol can be reduced even with variations in the steering torque during steering.

The steering force control function of the present invention is provided with means for increasing the instruction control voltage Vol to increase the assist force when the torque difference dtq2 between a predetermined target steering torque ttq and an actual steering torque tq2 is greater than a previous torque difference dtq1 and for decreasing the instruction control voltage Vol to decrease the assist torque with the passage of time when the torque difference dtq2 is negative or smaller than the previous torque difference dtq1.

Reverting back to the main flow chart, after the instruction control voltage Vol is calculated in step S24, when it is right steering, the instruction control voltage Vol is outputted in step S25. When it is left steering, the instruction control voltage Vol is outputted in step S26. Specifically, in step S25, the instruction control voltage Vol is outputted to the solenoid unit 58a of the first control valve 58 (hereinafter referred to as the "first control valve 58), and OV is outputted to the solenoid unit 59a of the second control valve 59 (hereinafter referred to as the "second control valve 59) to assist the steering force of the steering wheel 13 in right steering. This steering assist occurs because, as previously mentioned, the first control valve 58, when operated causes plunger 44a to press the pressed portion 42 generating in the torsion bar 9 a torsional moment in the right direction of the rotary valve 16. In step S26, the instruction control voltage Vol is outputted to the second control valve 59, and OV is outputted to the first control valve 58 to assist the steering force of the steering wheel 13 in left steering. This steering assist occurs because, as previously mentioned, the second control valve 59, when operated, causes plunger 44b to press the pressed portion 42, generating in the torsion bar 9 a torsional moment in the left direction of the rotary valve 16.

Thus, the steering force control function a the low-speed side is performed as above.

Next, the centering control function at the low-speed side will be described with reference to FIG. 11 and FIG. 12. The centering control function is to control the steering wheel 13 to revert back to the neutral position, even when hands are released from the steering wheel 13.

When it is determined in step S18 shown in FIG. 9 that the steering force control function flag is not Tqflag=1, determination is made in step S27 shown in FIG. 11 as to whether or not the absolute value |θh| of the steering wheel angle θh is 120 deg or more. When the absolute value |θh| is 120 deg or more, the flow chart shown in FIG. 12 is executed.

When the absolute value |θh| is 12 deg or more, as shown in FIG. 12, determination is made as to whether or not the centering flag Cflag=0. Since initially the centering flag Cflag=0, the centering flag Cflag=1 is set in step S29, and the instruction control voltage Vol is set to 3.5 V in step S30. After the instruction control voltage Vol is set to 3.5 V, determination is made in step S31 as to whether or not the steering wheel angle θh is 0 or more. When the steering wheel angle θh is 0 or more, the returning direction flag Haflag=1 is set in step S32 for right side returning (returning by steering in the left direction). When the steering wheel angle θh is negative, the returning direction flag Haflag=0 is set in step S33 for left side returning (returning by steering in the right direction). After setting the returning direction flag Haflag in step S32 and step S33, the centering control output routine in step S34 shown in FIG. 11 is executed.

Since determination is made in step S31 as to whether the steering wheel angle θh is positive or negative when the absolute value |θh| of the steering wheel angle θh is 120 deg or more (step S27: FIG. 11), and the returning direction of the steering wheel 13 is set in step S32 and step S33 according to the determination result, the returning direction is not unchanged even if the sign of the steering wheel angle is reversed due to a twist of the tires or the like when the steering wheel angle θh becomes small.

Thus, the absolute value |θh| of the steering wheel angle θh of 120 deg is the predetermined angle, and the centering control function of the present invention is provided with means for determining the returning direction of the steering wheel 13 according to the sign of the steering wheel angle θh when the absolute value |θh| is 120 deg or more.

The centering control output routine in step S34 will be described with reference to FIG. 19.

Figure 19:
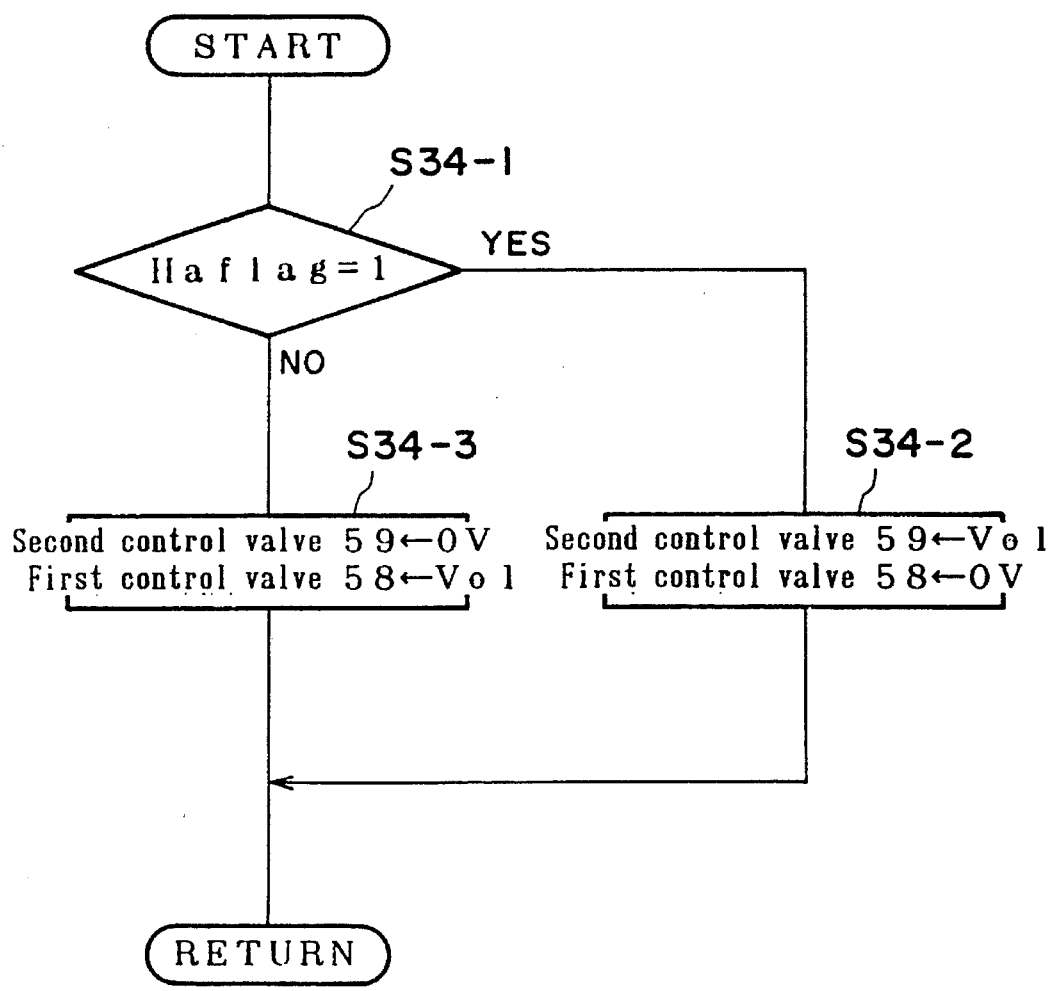
FIG. 19 is a control flow chart of the power steering apparatus.

As shown in FIG. 19, determination is made in step S34-1 as to whether or not the returning direction flag Haflag=1. When it is right side returning (Haflag=1), the instruction control voltage Vol is outputted to the second control valve 59 and OV is outputted to the first control valve 58 in step S34-2. Again the second control valve 59, when operated, causes plunger 44b to press the pressed portion 42, generating in the torsion bar 9 a torsional moment in the left direction of the rotary valve 16. (See area B in FIG. 21(d) where the left control voltage rises.) On the contrary, when it is left returning (Haflag=0), the instruction control voltage Vol is outputted to the first control valve 58 in step S34-3 and OV is outputted to the second control valve 59 in step S34-3. Again the firs control valve 58, when operated, causes plunger 44a to press the pressed portion 42, generating in the torsion bar 9 a torsional moment in the right direction of the rotary valve 16.

After outputting the instruction control voltage Vol in Step S34-2 and step S34-3, the processing returns to the main flow chart.

After returning to the main flow chart, through flow charts in FIG. 8, FIG. 9, and FIG. 11, determination is made in step S28 in FIG. 12 as to whether or not the centering flag Cflag=0, and since the centering flag Cflag=1 at this time, the instruction control voltage slow-up routine in step S35 is executed.

The instruction control voltage slow-up routine in step S35 will be described with reference to FIG. 18. In the instruction control voltage slow-up routine, the instruction control voltage Vol at the beginning of centering control is gradually increased to smoothly begin the starting of returning of the steering wheel 13.

Figure 18:
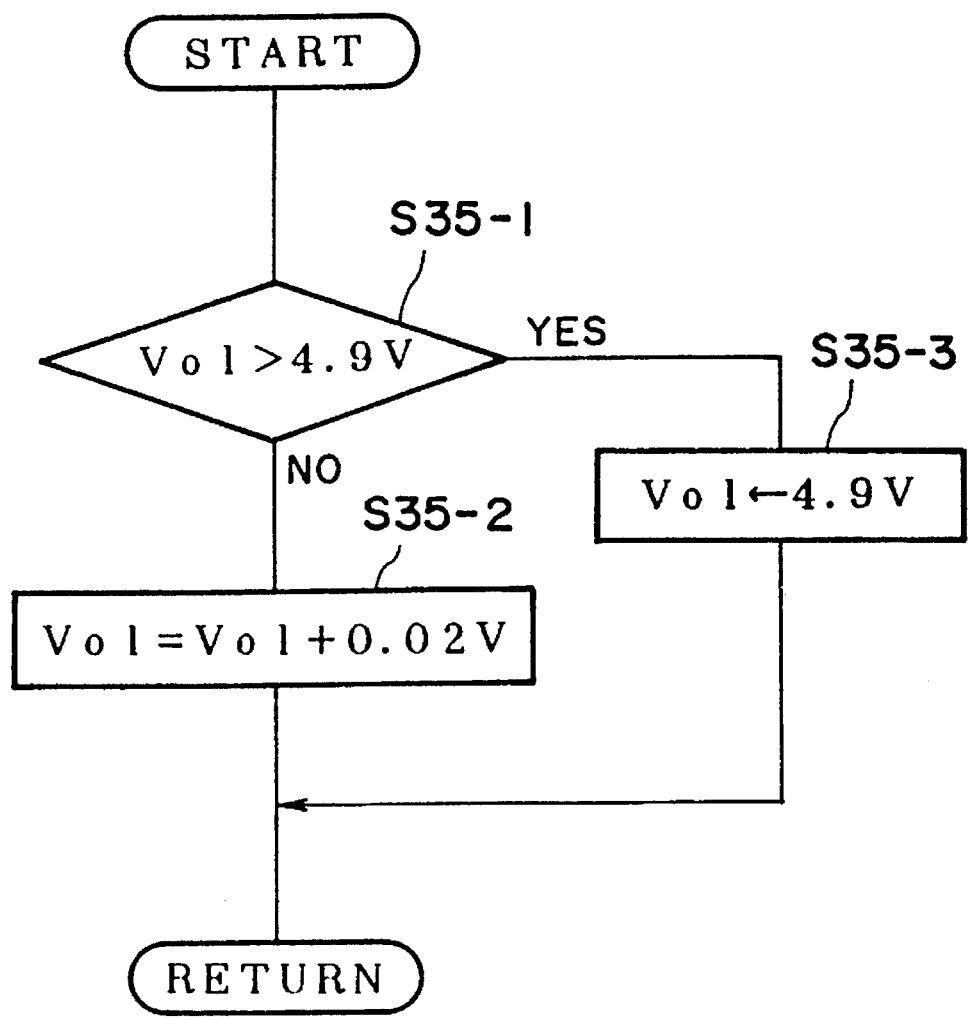
FIG. 18 is a control flow chart of the power steering apparatus.

As shown in FIG. 18, determination is made in step S35-1 as to whether or not the instruction control voltage Vol exceeds 4.9 V, when it is 4.9 V or less, 0.02 V is added to the instruction control voltage Vol in step S35-2 to obtain a new instruction control voltage Vol, and the processing goes to step S34. This procedure is repeated to increment the instruction control voltage Vol by 0.02 V until the instruction control voltage Vol is 4.9 V. (See area C in FIG. 21(d).) When the instruction control voltage Vol exceeds 4.9 V, the processing goes to step S34 in FIG. 11, and the instruction control voltage Vol is maintained at 4.9 V until the absolute value |θh| of the steering wheel angle θh is smaller than 120 deg in step S27 in FIG. 11.

Reverting back to the main flow chart, when the centering control function proceeds and it is determined in step S27 shown in FIG. 11 that the absolute value |θh| of the steering wheel angle θh is smaller than 120 deg, determination is made in step S36 as to whether or not the centering flag Cflag=0.

When it is determined in step S36 that the centering flag Cflag=0, the processing goes to step S34, and when it is determined that the centering flag Cflag=1, determination is made in step S37 as to whether or not the absolute value |θh| of the steering wheel angle θh is 45 deg or more. When the absolute value |θh| is 45 deg or more, that is, when the absolute value |θh| of the steering wheel angle θh is 45 deg or more and less than 120 deg, determination is made in step S38 as to whether or not the centering flag Cflag=1, and when the centering flag Cflag= 1, the instruction control voltage slow-up routine of step S35 is executed. When the centering flag is not Cflag=1, the instruction control voltage slow-down routing of step S39 is executed.

The instruction control voltage slow-down routing of step S39 will be described with reference to FIG. 17. In the instruction control voltage slow-down routine, the instruction control voltage Vol at the completion of the centering control is gradually decreased in two steps to smoothly stop the steering wheel 13.

Figure 17:
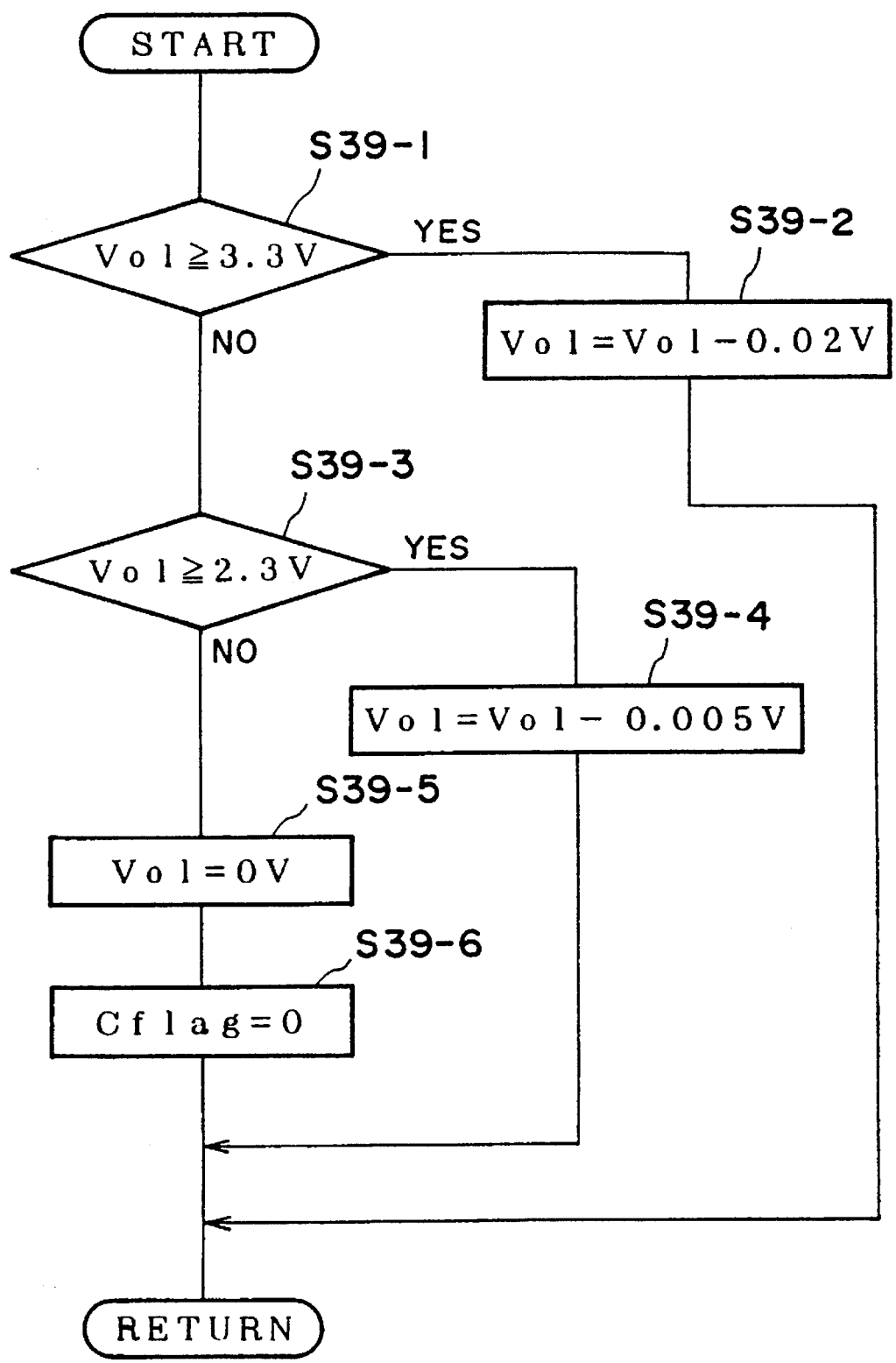
FIG. 17 is a control flow chart of the power steering apparatus.

As shown in FIG. 17, determination is made in step S39-1 as to whether or not the instruction control voltage Vol is 3.3 V or more. When it is 3.3 V or more, the instruction control voltage Vol is subtracted by 0.02 V in step S39-2 to obtain a new instruction control voltage Vol, and the processing goes to step S34 in FIG. 11. This procedure is repeated to decrement the instruction control voltage Vol by 0.02 V until the instruction control voltage Vol is less than 3.3 V (area E in FIG. 21(d)).

When it is determined in step S39-1 that the instruction control voltage Vol is less than 3.3 V, determination is made in step S39-3 as to whether or not the instruction control voltage Vol is 2.3 V or more. When it is 2.3 V or more, the instruction control voltage Vol is subtracted by 0.005 V to obtain a new instruction control voltage vol, and the processing goes to step S34 in FIG. 11. This procedure is repeated to decrement the instruction control voltage Vol by 0.005 V until the instruction control voltage Vol is less than 2.3 V (area F in FIG. 21 (d)).

When the instruction control voltage Vol decreases and it is determined in step S39-3 to be less than 2.3 V, the instruction control voltage Vol is set to 0 V in step S39-5, the centering flag Cflag=0 is set in step S39-6, and the processing returns to the main flow chart.

Thus, the centering control function of the present invention is provided with means for gradually increasing the instruction control voltage Vol to gradually increase the hydraulic pressure of the valve driving actuator 15 at the beginning of assist force generation and for gradually decreasing the instruction control voltage Vol to gradually decrease the hydraulic pressure of the valve driving actuator 15 at the completion of assist force generation.

On the other hand, when it is determined in step S37 shown in FIG. 11 that the absolute value |θh| of the steering wheel angle θh is smaller than 45 deg, determination is made in step S40 as to whether or not the centering flag Cflag=2, when the centering flag Cflag=2, processing goes to step S39, and when it is not the centering flag Cflag=2, the centering flag Cflag=2 is set in step S41, and the processing goes to step S34.

The centering flag Cflag=2 is an execution flag of the instruction control voltage slow-down routing in step S39 when the absolute value |θh| of the steering wheel angle θh once becomes less than 45 deg. That is, when the absolute value |θh| of the steering wheel angle θh becomes less than 45 deg C., the centering flag Cflag=2 is et, and after that, even if the absolute value |θh| of the steering wheel angle θh becomes 45 deg or more because the steering wheel 13 is excessively returned due to an external disturbance or the like, Cflag=1 in step S38 becomes false, and the processing goes to the instruction control voltage slow-down routine step S39.

Thus, the centering control function at the low-speed side is performed. In the centering control function, since a return moment is generated in the torsion bar 9 due to the control valves 58 and 59 even if the hands are released from the steering wheel 13, and the steering wheel 13 can be steered to the neutral position, burden can be considerably reduced when the steering wheel 13 is operated at the time the vehicle is in standstill condition, and the steering wheel 13 will never be remained in a steered condition.

In the centering control function, since the returning direction of the steering wheel 13 is determined from the sign of the steering wheel angle θh when the absolute value |θh| of the steering wheel angle θh is 120 deg or more, the control direction is not changed even if the direction of the steering wheel 13 changes in the vicinity of the neutral position, the steering wheel 13 can be controlled in excess to the reverse side (point P in FIG. 21(a)) in anticipation of a twist of the tires or the like to positively return the steering wheel 13 in the vicinity of the neutral position.

Furthermore, since the instruction control voltage Vol is gradually increased at the beginning of returning the steering wheel 13, and the instruction control voltage Vol is gradually decreased in two steps when the steering wheel 13 is in the vicinity of the neutral position, the beginning of returning and stopping the steering wheel 13 can be smoothed, and abrupt movement of the steering wheel 13 at stopping can be prevented.

Next, the steering counter-force control function at the high-speed side when the vehicle speed Vel is 15 km/h or more will be described.

When it is determined in step S12 in FIG. 8 that Vflag=1, that is, the vehicle speed Vel is 15 km/h or more, the steering counter-force control routine is executed.

The steering counter-force control routine in step S13 will be described with reference to FIG. 20. In the steering counter-force control routine in step S13, the target steering torque tq is determined from the vehicle speed Vel and the steering wheel angle θh, and output value of the instruction control voltage Vol and the control direction are determined according to the difference between the target steering torque tq and an actual steering torque tq2.

Figure 20:
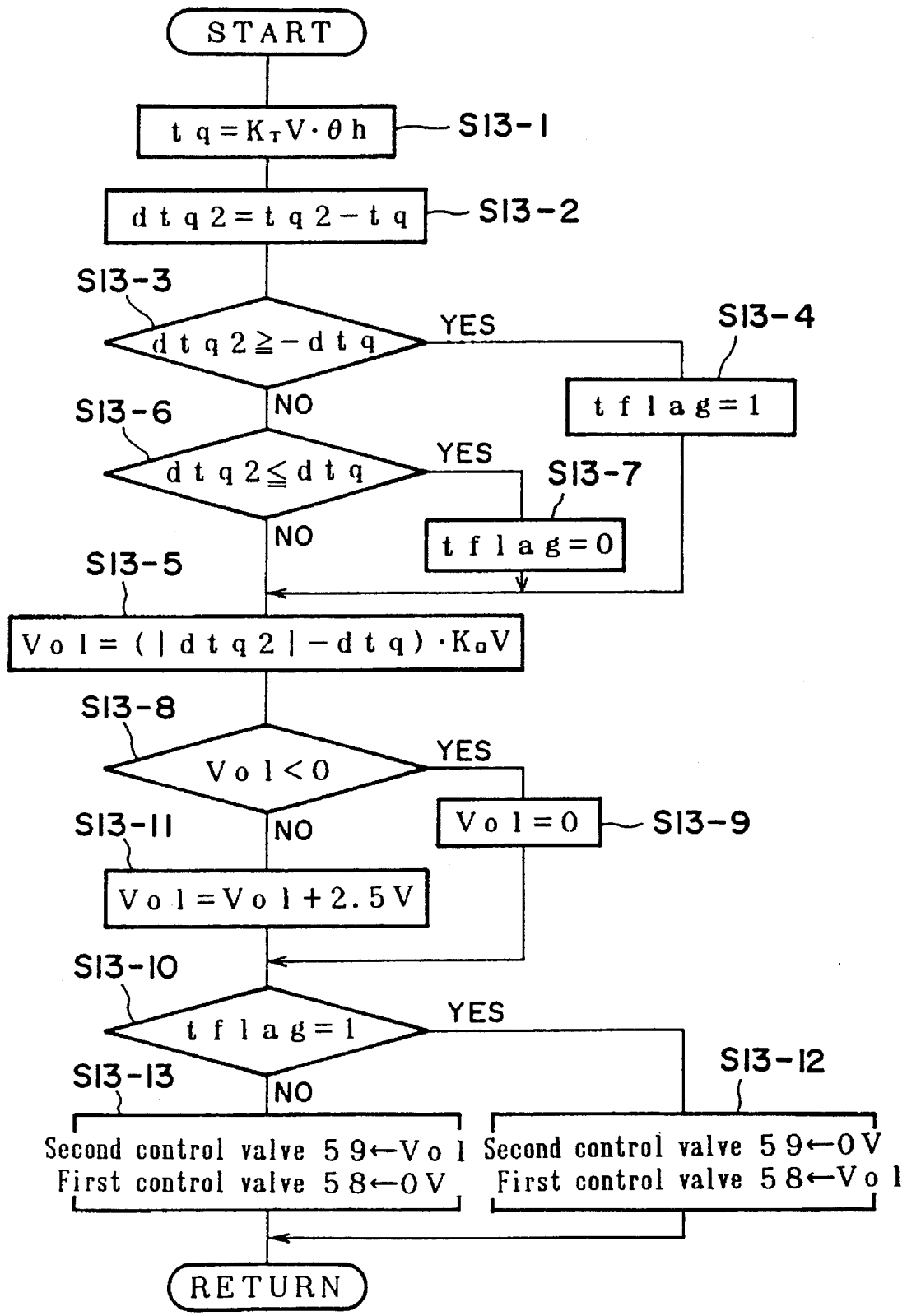
FIG. 20 is a control flow chart of the power steering apparatus.

As shown in FIG. 20, a current vehicle speed Vel and a target torque tq suitable for the steering wheel angle θh are calculated. That is, a vehicle speed-dependent steering wheel angle torque coefficient KTV according to the current vehicle speed Vel is read from the Vel-KTV map shown in FIG. 23, and the vehicle speed-dependent steering wheel angle torque coefficient KTV is multiplied by the steering wheel angle θh to determine the target torque tq. In step S13-2, the steering torque tq2 is subtracted by the target torque tq to determine a torque difference dtq2.

Figure 31:
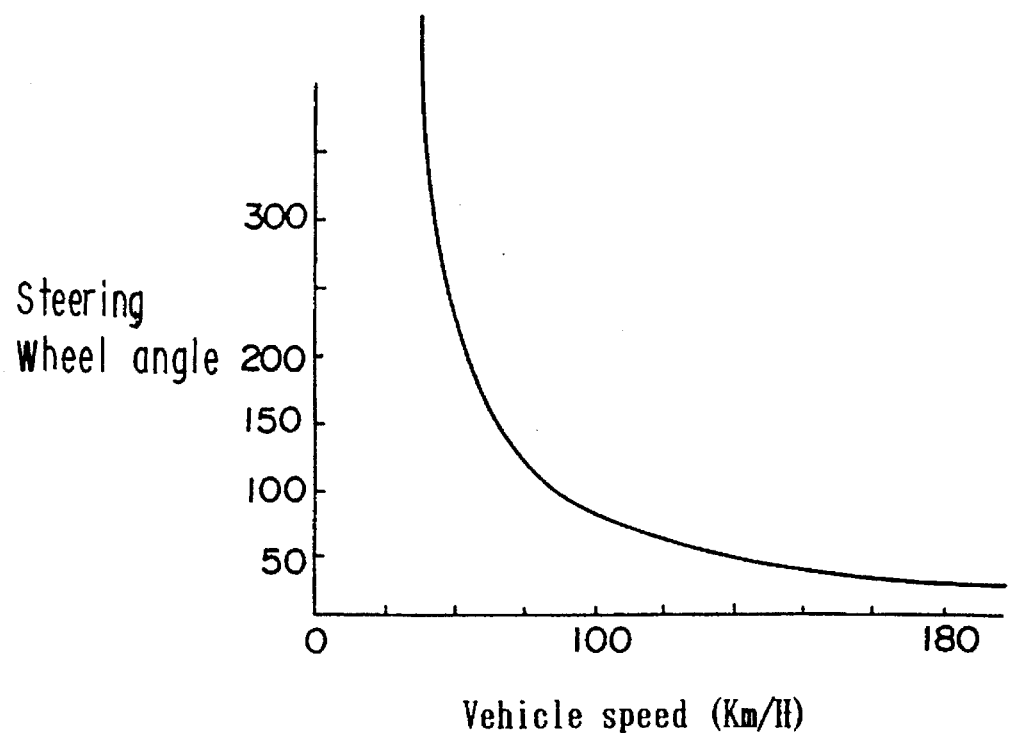
FIG. 31 is a graph of kk8 showing a steering wheel angle at a lateral acceleration 1G.

Another example for determining the target torque tq will now be described. In this example, the target torque tq is set by positive feedback of the steering wheel angular velocity as in the following equation to achieve a phase advance control in which the steering wheel angle phase leads the steering wheel force. In this case, the direction for heavier steering wheel force is positive, and the phase advance side is negative.

$$tq = Ygg \cdot KTV - (d\theta h/dt) \cdot Khv,$$

wherein Ygg is determined by the following equation:

$$Ygg = \theta h/kk8,$$

wherein kk8 is a steering wheel angle at a lateral acceleration 1G, which is determined from a graph shown in FIG. 31. kk8 is determined by the following equation:

$$\text{Steering wheel angle} = \{g(1+kv^2)L/v^2\} \times \rho \times 57.3,$$

wherein g is a gravitational acceleration, k is a stability factor, v is a vehicle speed, L is a wheel base, and ρ is a steering gear ratio.

Figure 32:
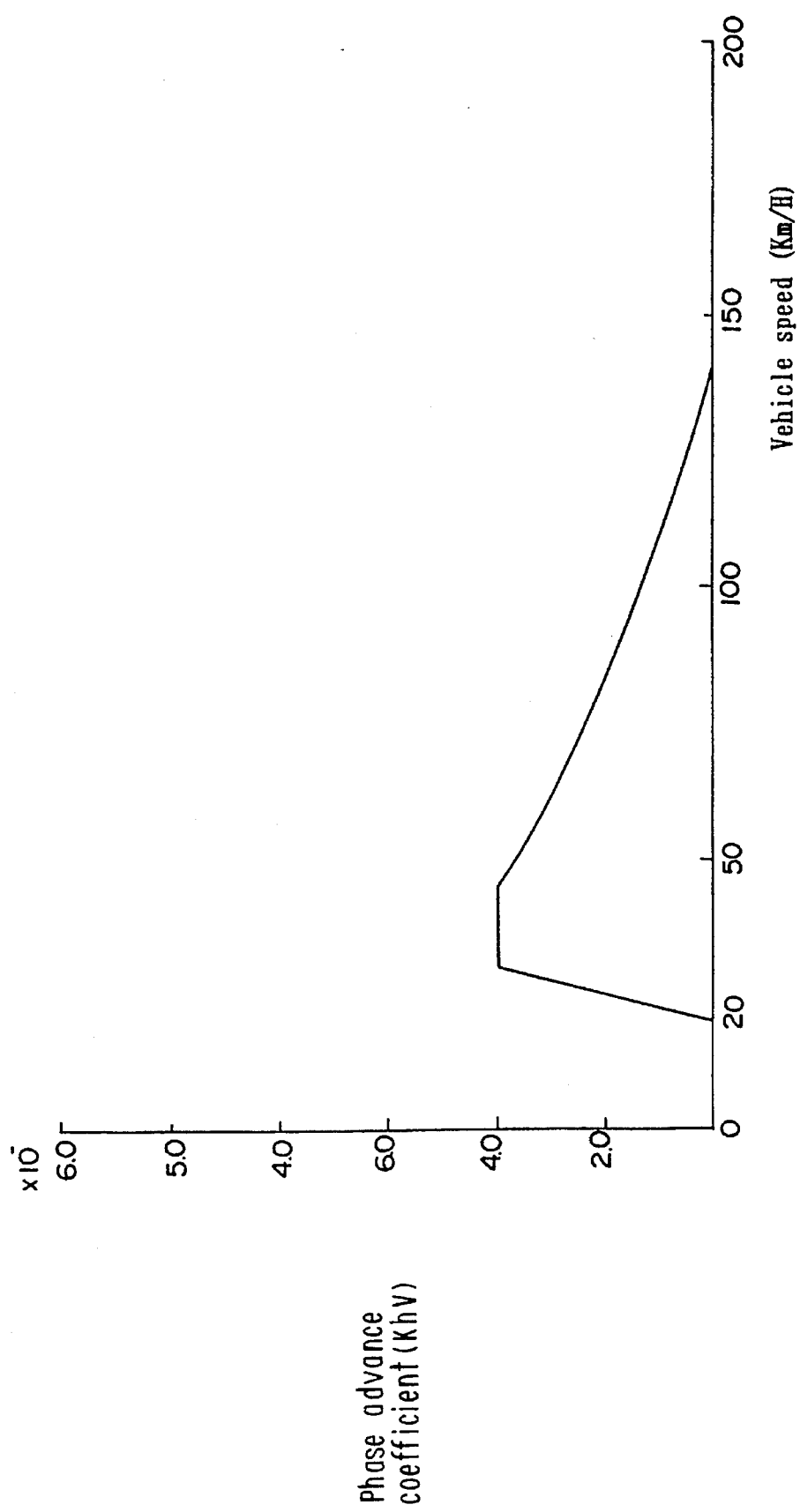
FIG. 32 is a graph showing a phase advance coefficient.

Khv is a phase advance coefficient, which is determined from the graph shown in FIG. 32.

Figure 23:
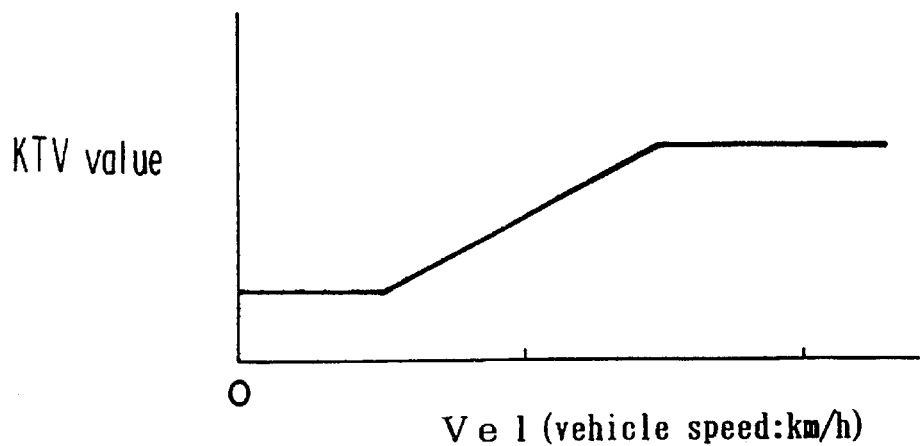
FIG. 23 is a graph showing a map of vehicle speed-dependent steering wheel angle torque coefficient according to a vehicle speed.

Therefor, kk8 is read from FIG. 31 and divided by the steering wheel angle θh to obtain Ygg, a vehicle speed-dependent steering wheel angle torque coefficient KTV according to the actual vehicle speed Vel is read from the Vel-KTV graph shown in FIG. 23, both values are multiplied, and the product is subtracted by a steering wheel angular velocity (θh) multiplied by the phase advance coefficient Khv defined from the graph of FIG. 32 to determine the target torque tq.

After that, in step S13-2, the steering torque tq2 is subtracted by the target torque tq to determine the torque difference dtq2.

Then, what phase advance control is performed by setting the target torque tq will be described. For simplicity, a model merely with the steering wheel force and the steering wheel angle will be discussed.

Figure 29:
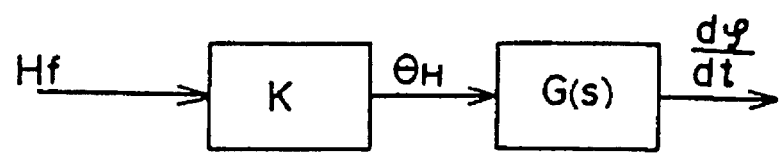
FIG. 29 is a diagram for explaining a vehicle response to the steering wheel force.

Specifically, when it is defined that the driver is steering the vehicle by the steering wheel force during traveling, response of the vehicle to the steering wheel force is expressed as shown in FIG. 29.

In FIG. 29, G(S) is vehicle transfer characteristics, Hf is a steering wheel force, θh is a steering wheel angle, dφ/dt is a yaw rate of the vehicle, and K is a conversion coefficient.

Figure 30:
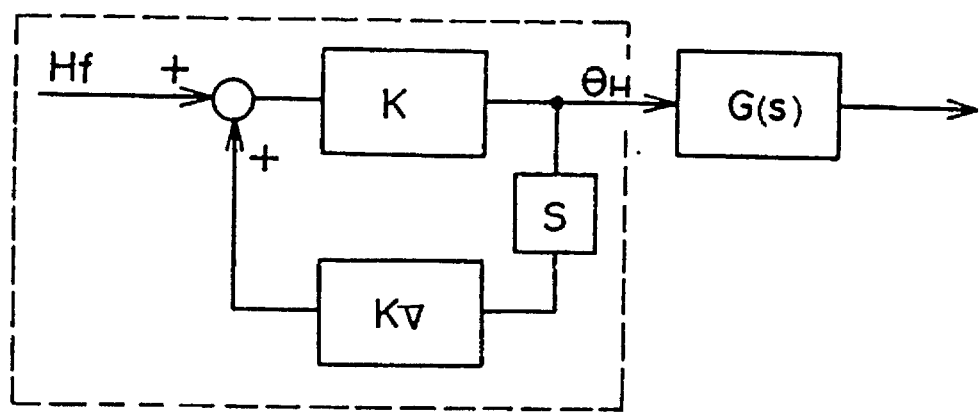
FIG. 30 is a diagram for explaining the vehicle response with a positive feedback of a steering wheel angular velocity to the steering wheel force.

Here, application of a positive feedback to the steering wheel force by a steering wheel angular velocity is represented as shown in FIG. 30, where Kv is a feedback coefficient.

A transfer function of the steering wheel angle θh to the steering wheel force Hf indicated by the dot-bar line in FIG. 30 is determined as follows:

$$G(S) = \theta h/Hf,$$

wherein $$\theta h = K \cdot (Hf + KvS \cdot \theta h),$$

$$\theta h = KHf + KKvS \cdot \theta h,$$

$$(1 - KKvS)\theta h = KHf,$$

$$\theta h/Hf = K/(1 - KKvS).$$

Therefore, $$G(S) = \theta/Hf = K/(1 - KKvS).$$

Here, when S=iω is set, the equation is expanded as follows, wherein S is the Laplacian.

$$\begin{aligned}G(S) &= K/(1 - i\omega KKv) \\ &= K/(1 - i\omega KKv) \times \{(1 + i\omega KKv)/(1 + i\omega KKv)\} \\ &= (K + i\omega K^2 Kv)/(1 + i^2 K^2 Kv^2) \\ &= K/(1 + \omega^2 K^2 Kv^2) + i\omega K^2 Kv/(1 + i^2 K^2 Kv^2).\end{aligned}$$

A phase tan φ is determined by the following equation:

$$\tan \phi = \omega K^2 Kv/K = \omega KKv.$$

Thus, by applying the positive feedback of the steering wheel angular velocity, the phase tan φ becomes a positive value, resulting in a phase advance in steering wheel angle relative to the steering wheel force and, in turn, a phase advance in yaw rate of the vehicle.

Figure 33:
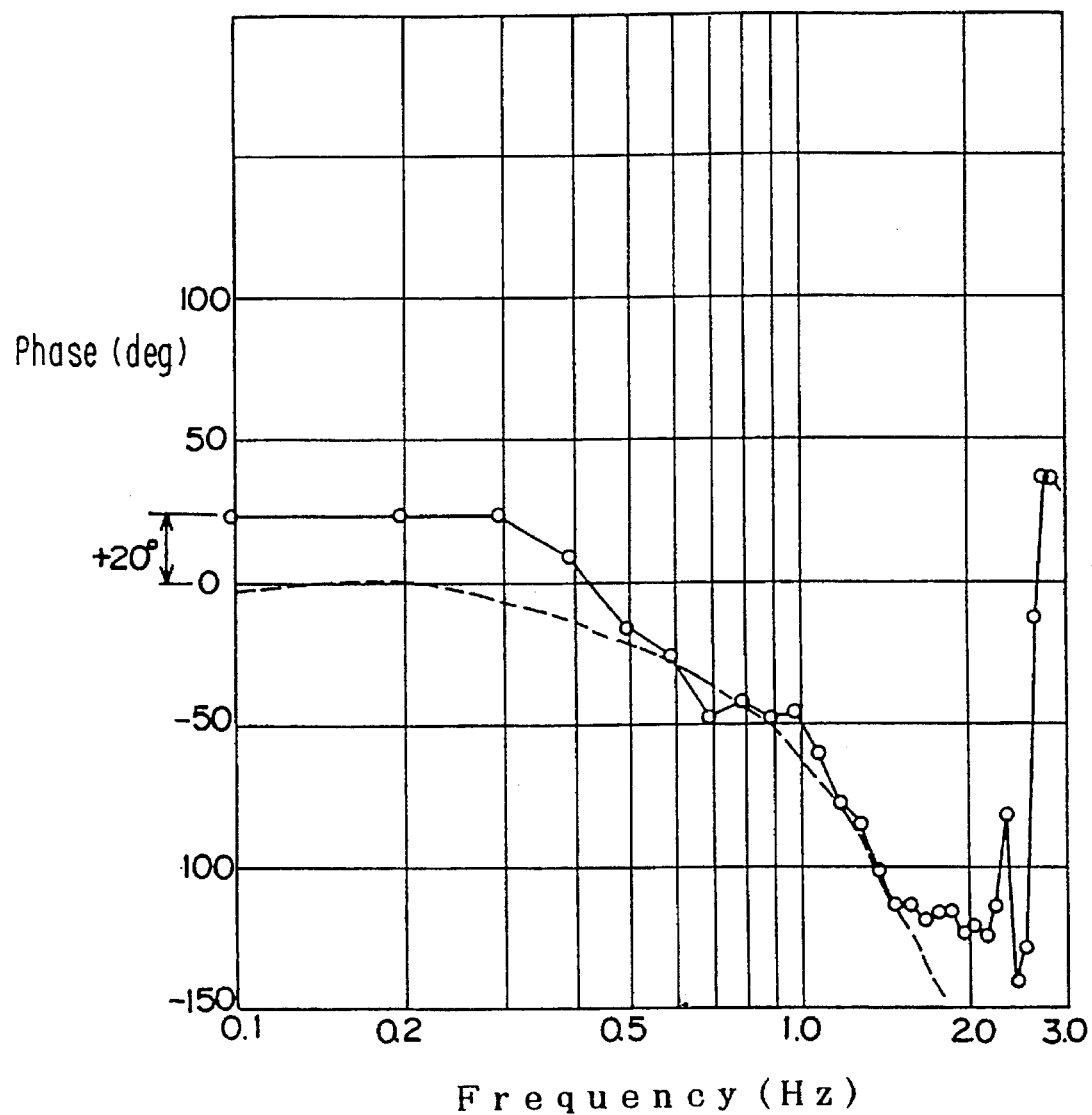
FIG. 33 is a graph showing a yaw rate phase to the steering wheel force.
Figure 34:
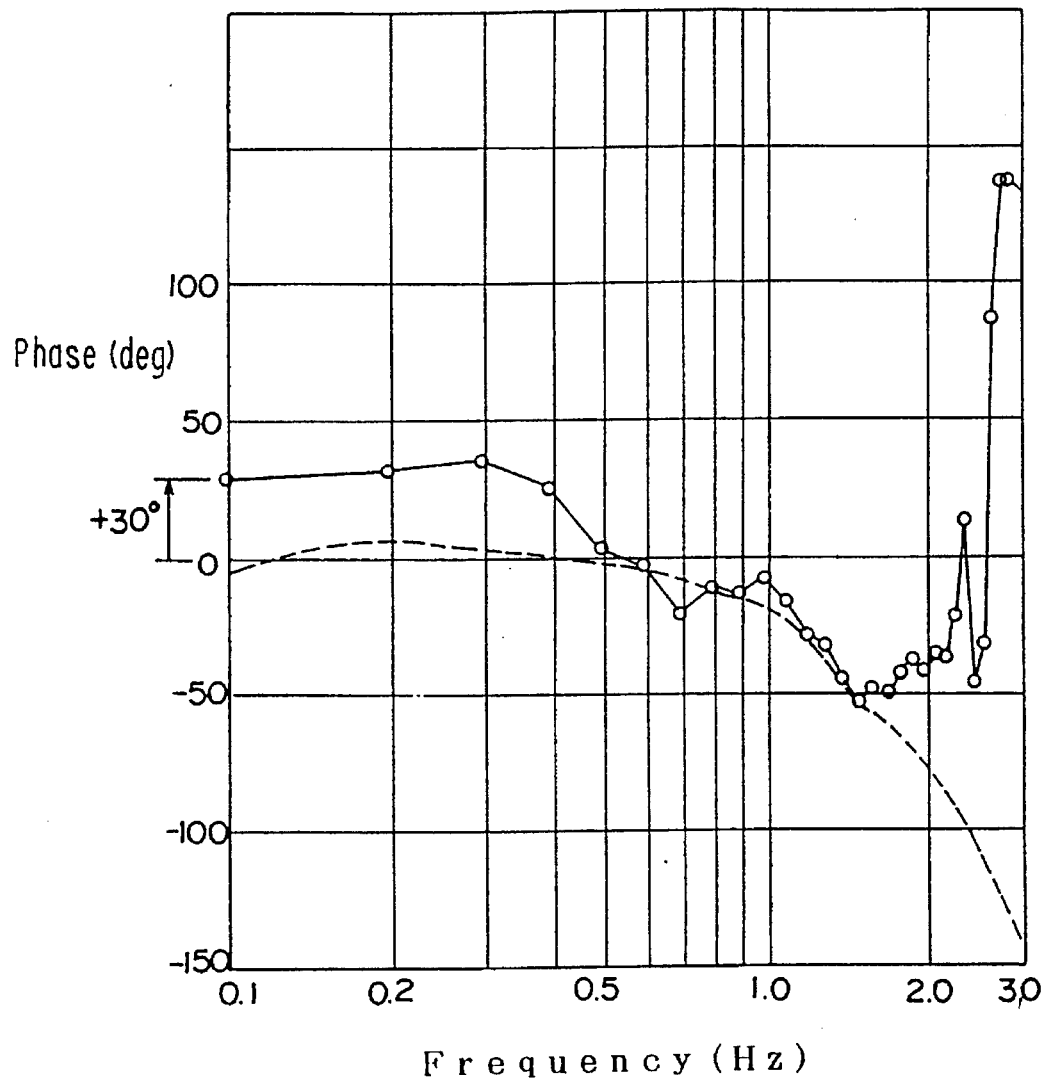
FIG. 34 is a graph showing a steering wheel angle phase to the steering wheel force.

Results of actual phase advance control are shown in FIG. 33 and FIG. 34. FIG. 33 shows the yaw rate phase again the steering wheel force, and FIG. 34 shows the steering wheel angle phase against the steering wheel force.

As shown in FIG. 33 and FIG. 34 in which the solid line indicates the case where the phase advance control is performed and the broken line indicates the case where the phase advance control is not performed, it can be seen that when the phase advance control is performed, the phase is advanced by about 20% compared to the case where the phase advance control is not performed in a low-frequency region (0.5 Hz or less). In a high-frequency region (2.0 Hz oar more), the phase is advanced even further.

The frequency shown on the abscissa in FIG. 33 and FIG. 34 corresponds to a steering frequency of the steering wheel. For example, 1 Hz corresponds to steering and returning in one second of eh steering wheel. However, since actual steering includes low-frequency components to high-frequency components, the frequency is determined by the Fourier transformation. Main components included in general steering are about 0.1 to 0.2 Hz.

Thus, in the phase advance control, since the phase of vehicle response is advanced relative to the input to the steering wheel, control is achieved in which the response time from steering of the steering wheel to the response of the vehicle is reduced to nearly zero, thereby obtaining a feeling to steer the vehicle as desired, that is, smoother and more natural steering feeling. Furthermore, the five does not require extra steering wheel manipulation and can efficiently steer the vehicle with a reduced steering wheel force.

Determination is made in step S13-3 as to whether or not the torque difference dtq2 is not less than the setting value at the right steering side–dtq, the steering direction flag tflag=1 is set in step S13-4 to set the right steering control, and the processing goes to step S13-5. When it is determined in step S13-3 that the torque difference dtq2 is smaller than the setting value–dtq, determination is made in step S13-6 as to whether or not the torque difference dtq2 is not greater than the setting value–dtq at the left steering side. When the torque difference dtq2 is not greater than the setting value dtq, the steering direction flag tflag=0 is set in step S13-7 to set the left steering control, and the processing goes to step S13-5. When the torque difference dtq2 exceeds the setting value, the processing, as is, goes to step S13-5.

Here, the reason for the setting value set to ±dtq is to allow some latitude in the setting value in order to prevent changes in steering direction even when the torque temporarily varies due to an external disturbance or the like.

After the steering direction is determined, the instruction control voltage Vol is calculated in step S13-5. That is, the absolute value |dtq2| of the torque difference dtq2 is subtracted by the setting value dtq, and the result is multiplied by a coefficient KoV to obtain an instruction control voltage Vol.

Determination is made in step S13-8 as to whether or not the instruction control voltage Vol is negative. When it is negative, the instruction control voltage Vol is set to 0 in step S13-9, and the processing goes to step S13-10. When it is positive, a dead zone voltage 2.5 V of the control valve is added to the instruction control voltage Vol to obtain a new instruction control voltage Vol, and the processing goes to step S13-10.

Determination is made in step S13-10 as to whether or not the steering direction flag tflag=1. When the steering direction flag tflag=1 the instruction control voltage Vol is outputted to the first control valve 58 and 0 V is outputted to the second control valve 59 in step S13-12. Again the first control valve 58, when operated, causes plunger 44a to press the pressed portion 42, generating in the torsion bar 9 a torsional moment in the right direction of the rotary valve 16. When the steering direction flag tflag=0 Ov is outputted to the first control valve 58 and the instruction control voltage Vol is outputted to the second control valve 59 in step S13-13. Again the second control valve 59, when operated, causes plunger 44b to press the pressed portion 42, generating in the torsion bar 9 a torsional moment in the left direction of the rotary valve 16.

Thus, in the steering counter-force control function at the high-speed side, the control direction and the instruction control voltage Vol are determined from the torque difference between the target torque tq and the steering torque tq2. The assist control is set when the steering torque tq2 is greater (especially at the beginning of steering), and the counter-force control is set when the steering torque tq2 is smaller, thereby obtaining a linear steering force.

The steering counter-force control function of the present invention is provided with means for calculating the target steering torque (target torque tq) of the steering wheel and for determining the magnitude and direction of the assist force according to the torque difference dtq2 between the calculated target steering torque and an actual steering torque tq2 so that the steering torque tq2 is the target steering torque.

With the above-described steering force control function and centering control function at the low-speed side and the steering counter-force control function at the high-speed side, steering wheel operation of a small burden is achieved under all steering conditions such as steering during a standstill condition of the vehicle, high-speed traveling, sports traveling and the like.

Figure 25:
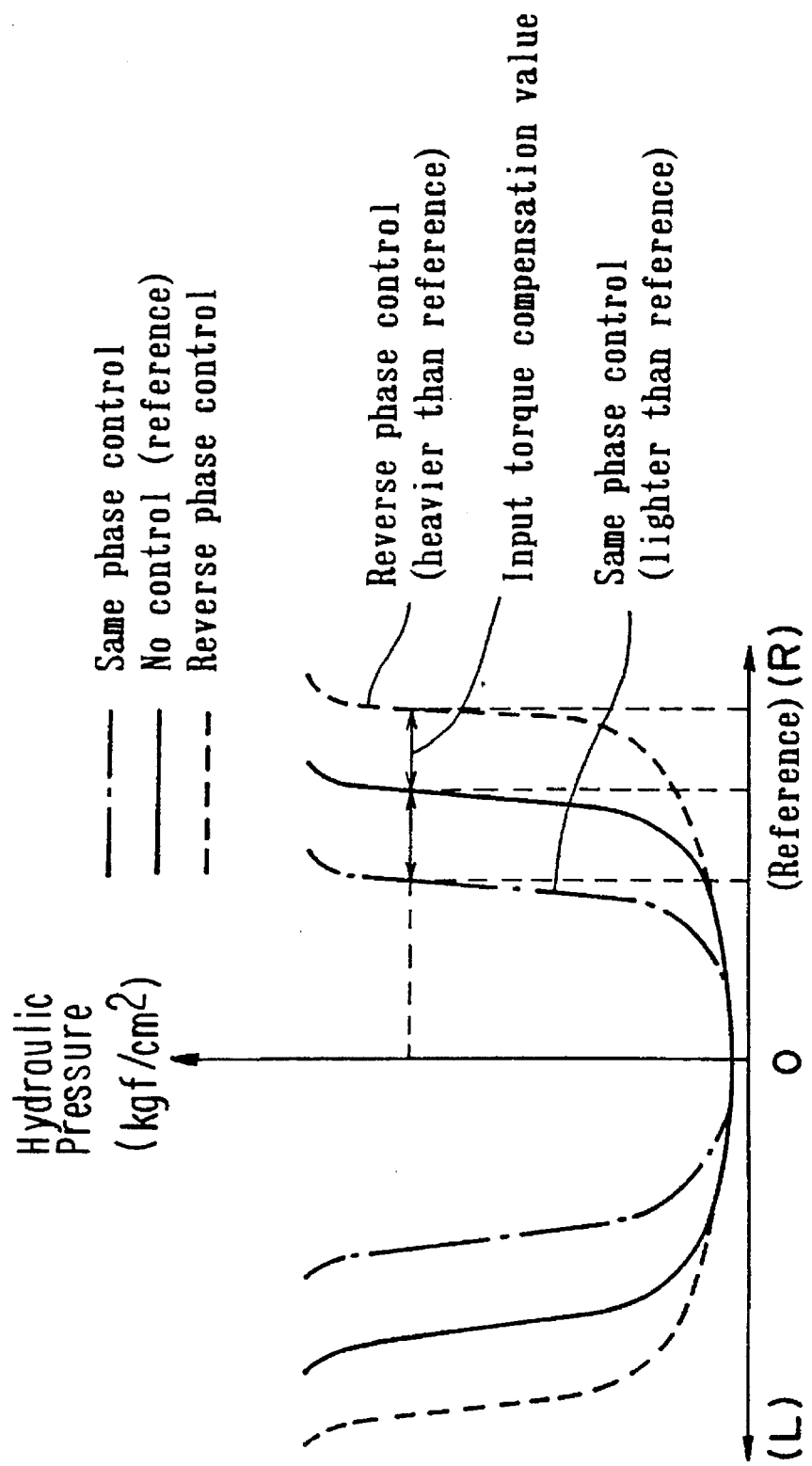
FIG. 25 is a graph showing input/output pressure of a rotary valve with changes in operation angle.

The hydraulic pressure generation characteristics of the rotary valve 16 obtained in the above control provide, as shown in the diagram in FIG. 25, broad hydraulic pressure areas based on the case without control of the plungers 44a and 44b, combined with the hydraulic pressure area of the same phase control by the plunger 44a and the hydraulic pressure area of the reverse phase control by the plunger 44b, added to the upper and lower limits.

Figure 26A:
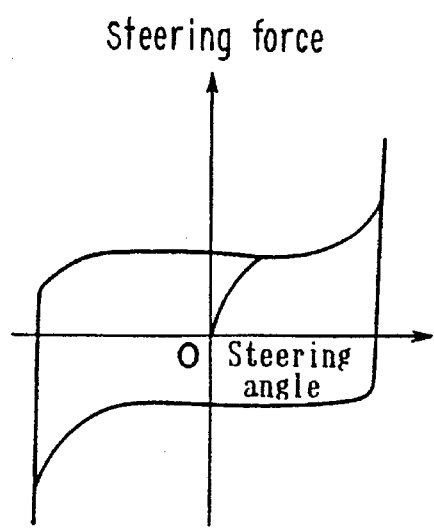
FIG. 26 is a graph showing a steering force when a steering wheel is steered in a standstill condition of the vehicle, compared with the prior art.
Figure 26B:
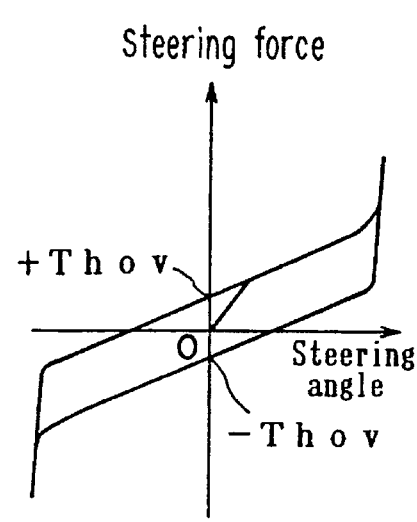
Figure 27A:
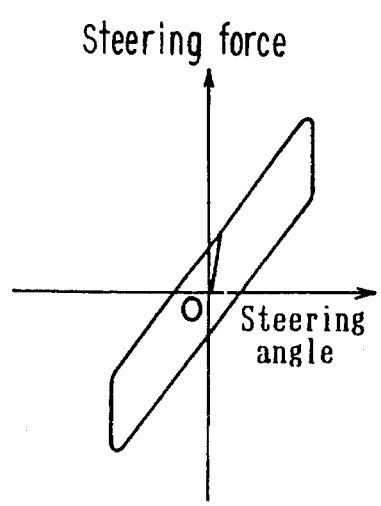
FIG. 27 is a graph showing a steering force in a slalom traveling steering, compared with the prior art.
Figure 27B:
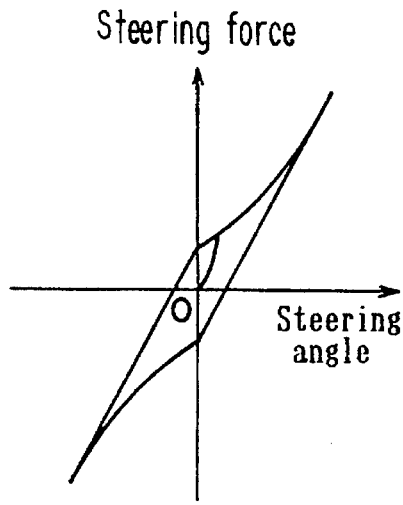

In steering under a standstill condition of the vehicle, for example, steering tends to be heavy at the beginning with the prior art power steering apparatus as shown in FIG. 26(a), requiring a substantially large steering force over the entire range of the steering angle. However, with the control according to the present invention, steering is light at the beginning as shown in FIG. 26(b), and the steering force varies with the steering angle. Furthermore, in steering during a slalom traveling, the prior art power steering apparatus has a large hysteresis as shown in FIG. 27(a) with the lack of steering response feeling in the vicinity of the neutral position, however, with the control according to the present invention, steering characteristics with reduced hysteresis and a steering response feeling are obtained in the vicinity of the neutral position, as shown in FIG. 27(b).

Therefor, the present invention can cope with environmental conditions such as long-distance, high-speed traveling and operation by aged drivers, and can reduce burden of steering operation in vehicles provided with additional functions such as four-wheel driving cars and four-wheel steering cars.

Figure 28:
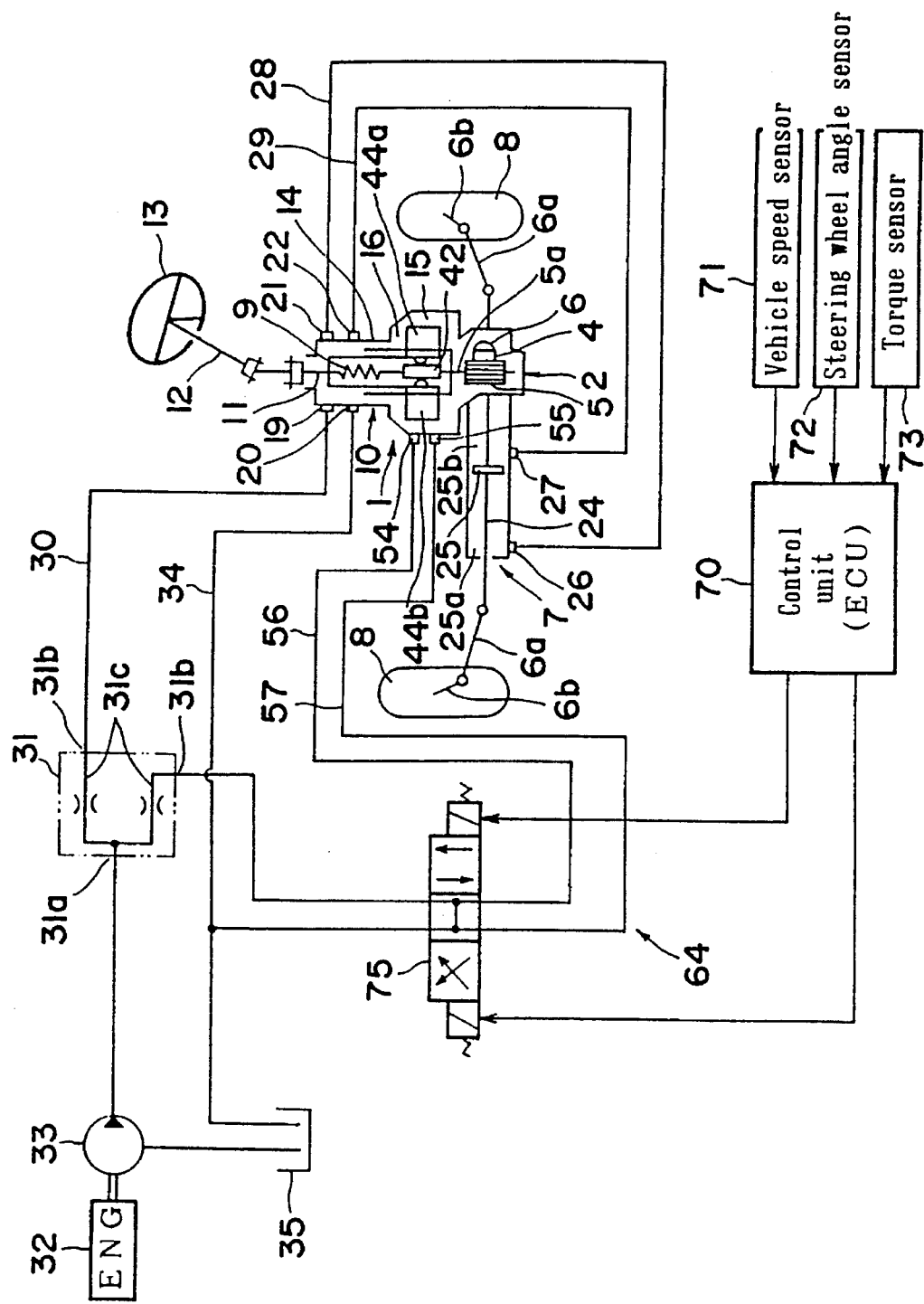
FIG. 28 is a schematic view showing the entire structure of another embodiment of the power steering apparatus according to the present invention.

In the above-described embodiment, the plungers 44a and 44b are driven using the two control valves 58 and 59. However, the present invention is not limited to the embodiment, and the same effect can be obtained by using a 4-port 3-position electromagnetic select valve 75 as shown in FIG. 28 to drive the plungers 44a and 44b as in the above embodiment.

Furthermore, in the above embodiment the pressed portions 42 are provided on the input shaft and the plungers 44a and 44b, on the output shaft. However, the present invention is not limited to this arrangement, but the plungers 44a and 44b may be provided on the input shaft and the pressed portion, 42, provided on the output shaft to generate a torsional moment in the torsion bar.

With the power steering apparatus for a vehicle according to the present invention, the steering force variable range can be considerably broadened and the driver's burden in steering during a standstill condition of the vehicle can be remarkably reduced, thereby obtaining a steering force according to the operation condition such as high-speed traveling, sports traveling and the like. Therefor, the present invention can cope with all steering conditions such as long-distance high-speed traveling, aged drives and the like, and can reduce the burden of steering wheel operation in vehicles provided with additional functions such as four-wheel driving vehicles, four-wheel steering vehicles and the like.

Especially, in the centering control function such as steering during a standstill condition of the vehicle, since the hydraulic pressure of the valve driving mechanism is gradually increased at the beginning of assist force generation and the hydraulic pressure of the valve driving mechanism is gradually decreased at the completion of assist force generation, smooth returning operation of the steering wheel from the beginning to the completion is achieved in the centering control function.

Furthermore, since the pressed portion 42, of the valve driving mechanism is pressed by the plungers, 44a and 44b, from both sides in the circumferential direction of the input/output shaft, the valve driving mechanism is not elongated in the axial direction of the input/output shaft, thereby enabling a lightweight, compact apparatus.

In the centering control function at the low-speed region, since the control determination torque threshold value for determining execution of the centering control function is set greater than the control determination torque threshold value for determining execution of the steering force control function, the steering torque does not exceed the control determination torque threshold value during the operation of the centering control function even when the steering torque temporarily increases due to inertia of the steering wheel or the like. Therefor, stable centering control with no mis-operation is possible.

Furthermore, in the low-speed region, the centering control function is performed when the steering force of the steering wheel within the control determination torque threshold value for execution determination of the centering control function continues for a predetermined period of time, and no immediate shift to the centering control function takes place even if the steering torque decreased momentarily. Therefor, steering wheel operation and centering steering can be achieved with a natural feeling.

Since the determination of steering direction in the steering force control function is made with the control determination torque threshold value in the reverse steering direction, and the determination of the steering wheel angular velocity is made with the steering wheel angular velocity in the reverse steering direction, the steering direction does not repeatedly change even when the steering torque and the steering wheel angular velocity are temporarily changed to positive and negative valued due to variations in the steering torque and the steering wheel angular velocity. As a result, mis-operation in the change over of the steering direction is prevented and rapid change over of the steering direction is achieved.

In the steering force control function, the assist force is increased when a torque difference between the target steering torque and an actual steering torque is greater than the previous torque difference, and the assist force is decreased with the passage of time when the torque difference is smaller than the previous torque difference, thereby reducing the variation frequency of control amount during the operation of the steering force control function. As a result, smooth steering wheel operation characteristics can be obtained.

In the centering control function, the returning direction of the steering wheel is determined from the steering wheel angle of a predetermined angle or more, returning the steering wheel in the determined direction until a reverse setting angle is reached, thereby returning the steering wheel in excess to the reverse side in anticipation of a twist of the tires or the like. As a result, the steering wheel can be positively returned in a free condition to the neutral position, thereby improving the returning precision of the steering wheel at the completion of control.

In the steering counter-force control function, magnitude and direction of the assist force are determined according to the torque difference between the calculated steering torque and the actual steering torque so that the steering torque is the target steering torque, thereby obtaining a linear steering counter-force and remarkably improving the steering feeling.

Furthermore, with the phase advance control, delay in vehicle response is reduced to nearly zero, the driver can steer the vehicle as desired with smooth and natural steering feeling and without extra steering wheel manipulation.

What is claimed is:

1. A power steering apparatus for a vehicle comprising:

a steering mechanism including an input shaft connected to a steering wheel side and an output shaft connected to steered wheels, rotatably supported coaxially in a housing and elastically connected to be rotatable relative to each other, for steering the steered wheels according to steering operation of said steering wheel;

valve means for controlling supply of a fluid to a power cylinder exerting an assist force on said output shaft according to relative rotation between said input shaft and said output shaft;

a pressed portion disposed to be projected to at least one side of said input shaft and said output shaft in a radial direction of the shaft;

a large-diameter portion disposed at least the other side of said input shaft or said output shaft and having a chamber for rotatably containing said pressed portion;

first and second hydraulic pressure chambers formed independent of each other between said housing and said large-diameter portion;

a first plunger slidably engaged with a hole formed in said large-diameter portion and opening to said first hydraulic pressure chamber to contact against said pressed portion, for pressing said pressed portion in one direction by a hydraulic pressure applied to said first hydraulic pressure chamber for applying a rotational force to said input shaft or said output shaft;

a second plunger slidably engaged with a hole formed in said large-diameter portion and opening to said second hydraulic pressure chamber to contact against said pressed portion, for pressing said pressed portion in one direction by a hydraulic pressure applied to said second hydraulic pressure chamber for applying a rotational force to said input shaft or said output shaft;

first and second annular oil passages connected individually to said first and second hydraulic pressure chambers; and control valves for controlling hydraulic pressures to said first and second hydraulic pressure chambers for driving said first and second plungers through said first and second annular oil passages.

2. A power steering apparatus for a vehicle comprising:

a steering mechanism including an input shaft connected to a steering wheel side and an output shaft connected to steered wheels, rotatably supported coaxially in a housing and elastically connected to be rotatable relative to each other, for steering the steered wheels according to steering operation of said steering wheel;

valve means for controlling supply of a fluid to a power cylinder exerting an assist force on said output shaft according to relative rotation between said input shaft and said output shaft;

a pressed portion disposed to be projected to at least one side of said input shaft and said output shaft in a radial direction of the shaft;

a large-diameter portion disposed at least the other side of said input shaft or said output shaft and having a chamber for rotatably containing said pressed portion;

first and second hydraulic pressure chambers formed independent of each other between said housing and said large-diameter portion;

a first plunger slidably engaged with a hole formed in said large-diameter portion and opening to said first hydraulic pressure chamber to contact against said pressed portion, for pressing said pressed portion in one direction by a hydraulic pressure applied to said first hydraulic pressure chamber for applying a rotational force to said input shaft or said output shaft;

a second plunger slidably engaged with a hole formed in said large-diameter portion and opening to said second hydraulic pressure chamber to contact against said pressed portion, for pressing said pressed portion in one direction by a hydraulic pressure applied to said second hydraulic pressure chamber for applying a rotational force to said input shaft or said output shaft;

first and second annular oil passages connected individually to said first and second hydraulic pressure chambers;

control valves for controlling hydraulic pressures to said first and second hydraulic pressure chambers for driving said first and second plungers through said first and second annular oil passages; and a fluid change-over circuit having a fixed mode for driving simultaneously said first and second plungers for regulating rotation of said input shaft or output shaft and a rotation mode for driving one of said first and second plungers for exerting a rotational force on said input shaft or said output shaft, whereby selecting one of said modes according to operation condition of the vehicles.

3. A power steering apparatus for a vehicle comprising:

a steering mechanism including an input shaft connected to a steering wheel side and an output shaft connected to steered wheels, rotatably supported coaxially in a housing and elastically connected to be rotatable relative to each other, for steering the steered wheels according to steering operation of said steering wheel;

valve means for controlling supply of a fluid to a power cylinder exerting an assist force on said output shaft according to relative rotation between said input shaft and said output shaft;

a pressed portion disposed to be projected to at least one side of said input shaft and said output shaft in a radial direction of the shaft;

a large-diameter portion disposed at least the other side of said input shaft or said output shaft and having a chamber for rotatably containing said pressed portion;

first and second hydraulic pressure chambers formed independent of each other between said housing and said large-diameter portion;

a first plunger slidably engaged with a hole formed in said large-diameter portion and opening to said first hydraulic pressure chamber to contact against said pressed portion, for pressing said pressed portion in one direction by a hydraulic pressure applied to said first hydraulic chamber for applying a rotational force to said input shaft or said output shaft;

a second plunger slidably engaged with a hole formed in said large-diameter portion and opening to said second hydraulic pressure chamber to contact against said pressed portion, for pressing said pressed portion in one direction by a hydraulic pressure applied to said second hydraulic pressure chamber for applying a rotational force to said input shaft or said output shaft;

first and second annular oil passages connected individually to said first and second hydraulic pressure chambers;

control valves for controlling hydraulic pressures to said first and second hydraulic pressure chambers for driving said first and second plungers through said first and second annular oil passages;

operation condition detection means for detecting operation condition of the vehicle; and control means for controlling operation of said control valves in response to detection signal detected by said operation condition detection means.

4. The power steering apparatus for a vehicle of claim 3 wherein said operating condition detection means includes:

a vehicle speed sensor for detecting a traveling speed of the vehicle;

a steering wheel angle sensor for detecting a steering angle of said steering wheel; and a torque sensor for detecting a torque applied to said steering wheel.

5. The power steering apparatus for a vehicle of claim 3 wherein an instruction control voltage outputted from said control means to a solenoid for operating said control valves is gradually increased at the beginning of control over said control valves and gradually decreased towards ending of control over said control valves.

6. The power steering apparatus for a vehicle of claim 3, wherein said control means has a steering force control function for driving at least said first or second plunger in the same direction as the steering direction of said steering wheel in a low-speed area of the vehicle less than a predetermined value for applying a rotational force of the same direction to said input or output shaft, whereby controlling operation of said control valves to assist steering of said steering wheel.

7. The power steering apparatus for a vehicle of claim 6, wherein said control means has a determination function for effecting the steering force control function, and the determination function compares a steering torque detected by said operation condition detection means and a preset control determination torque threshold value to effect the steering force control function when the steering torque exceeds the torque threshold value.

8. The power steering apparatus for a vehicle of claim 7, wherein said control means has steering direction determination means for comparing a steering torque of said steering wheel with a control determination threshold value corresponding to a steering direction of said steering wheel, and a steering wheel angular velocity calculated from a steering wheel angle detected by said operation condition detection means with a preset threshold value of steering wheel angular velocity corresponding to a steering direction of said steering wheel to determine whether the steering direction of said steering wheel is at right steering condition or a left steering condition; and said steering force control function is set to effect right steering control or left steering control according to the steering direction of said steering wheel determined by said steering direction determination means.

9. The power steering apparatus for a vehicle of claim 8 wherein said steering direction determination means is set so that the steering torque of said steering wheel and the steering wheel angular velocity are compared with the steering direction determination threshold value set in the reverse direction to a steering direction to be determined and the steering wheel angular velocity threshold value to determine the steering direction.

10. The power steering apparatus for a vehicle of claim 9, wherein said steering counter-force control function determines a torque difference from a target steering torque determined from the vehicle speed and the steering wheel angle detected by said operation condition detection means and a steering torque of said steering wheel detected by said operation condition detection means and drives said first and second plungers so that the steering torque approaches the target steering torque according to the torque difference.

11. The power steering apparatus for a vehicle of claim 8, wherein said steering direction control function drives said first or second plunger to even further assist steering of said steering wheel when a torque difference determined from a preset target steering torque and a steering torque of said steering wheel detected by said operation condition detection means is greater than a previous torque difference determined from the target steering torque and the previously detected steering torque, or reduces the assist to steering of said steering wheel with the passage of time when the torque difference is a negative value or the torque difference is smaller than the previous torque difference.

12. The power steering apparatus for a vehicle of claim 3, wherein said control means has a steering counter-force control function for driving at least said first or second plunger in the reverse direction to the steering direction of said steering wheel in a high-speed area of the vehicle more than a predetermined value for applying a rotational force of the reverse direction to said input or output shaft, whereby controlling operation of said control valves to regulate steering of said steering wheel.

13. The power steering apparatus for a vehicle of claim 12 wherein said steering counter-force control function has phase advance control means for positively increasing the steering wheel angle relative to the steering torque of said steering wheel by setting a target torque necessary for operation of said steering wheel by positive feedback of the steering wheel angular velocity.

14. The power steering apparatus for a vehicle of claim 3 wherein said control means has a centering control function for driving at least said first or second plunger in the reverse direction to the steering direction of said steering wheel in a low-speed area of the vehicle less than a predetermined value for applying a rotational force of the reverse direction to said input or output shaft, whereby controlling operation of said control valves to return said steering wheel to a neutral position.

15. The power steering apparatus for a vehicle of claim 14, wherein said centering control function has return direction determination means for determining a return direction of said steering wheel from a positive or negative condition of the steering wheel angle when an absolute value of steering wheel angle detected by said operation condition detection means exceeds a predetermined steering angle.

16. The power steering apparatus for a vehicle of claim 3, wherein said control means has a steering force control function for driving at least said first or second plunger in the same direction as the steering direction of said steering wheel in a low-speed area of the vehicle less than a predetermined value for applying a rotational force of the same direction to said input or output shaft, whereby controlling operation of said control valves to assist steering of said steering wheel, and a steering counter-force control function for driving at least said first or second plunger in the reverse direction to the steering direction of said steering wheel in a high-speed area of the vehicle more than a predetermined value for applying a rotational force of the reverse direction to said input or output shaft, whereby controlling operation of said control valves to regulate steering of said steering wheel.

17. The power steering apparatus for a vehicle of claim 3, wherein said control means has a steering force control function for driving at least said first or second plunger in the same direction as the steering direction of said steering wheel in a low-speed ahead of the vehicle less than a predetermined value for applying a rotational force of the same direction to said input or output shaft, whereby controlling operation of said control valves to assist steering of said steering wheel; and a centering control function for driving at least said first or second plunger in the reverse direction to the steering direction of said steering wheel in a low-speed area of the vehicle less than a predetermined value for applying a rotational force of the reverse direction to said input or output shaft, whereby controlling operation of said control valves to return said steering wheel to a neutral position.

18. The power steering apparatus for a vehicle of claim 17 wherein said control means has a determination function for determining execution of one of said steering force control function and said centering control function, and said determination function compares a steering torque detected by said operation condition detection means and a preset control determination torque threshold for beginning execution of one of said two functions when the steering torque exceeds the torque threshold value.

19. The power steering apparatus for a vehicle of claim 18 wherein the control determination threshold value has a first torque threshold value for determining execution of said steering force control function, and a second torque threshold value for determining execution of said centering control function, the second torque threshold value being set greater than the first torque threshold value.

20. The power steering apparatus for a vehicle of claim 18 wherein the control determination threshold value has a first torque threshold value for determining execution of said steering force control function, and a second torque threshold value for determining execution of said centering control function, and said centering control function is effected when the steering torque of said steering wheel continues within the second torque threshold value for a predetermined length of time.

21. The power steering apparatus for a vehicle of claim 3 wherein said control means has a steering force control function for driving at least said first or second plunger in the same direction as the steering direction of said steering wheel in a low-speed area of the vehicle less than a predetermined value for applying a rotational force of the same direction to said input or output shaft, whereby controlling operation of said control valves to assist steering of said steering wheel;

a steering counter-force control function for driving at least said first or second plunger in the reverse direction to the steering direction of said steering wheel in a high-speed area of the vehicle more than a predetermined value for applying a rotational force of the reverse direction to said input or output shaft, whereby controlling operation of said control valves to regulate steering of said steering wheel; and a centering control function for driving at least said first or second plunger in the reverse direction to the steering direction of said steering wheel in a low-speed area of the vehicle less than a predetermined value for applying a rotational force of the reverse direction to said input or output shaft, whereby controlling operation of said control valves to return said steering wheel to a neutral position.

* * * * *